(12) United States Patent
Bi

(10) Patent No.: US 9,298,276 B1
(45) Date of Patent: Mar. 29, 2016

(54) WORD PREDICTION FOR NUMBERS AND SYMBOLS

(71) Applicant: Google Inc., Mountain View, CA (US)

(72) Inventor: Xiaojun Bi, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/144,825

(22) Filed: Dec. 31, 2013

(51) Int. Cl.
*G06F 3/00* (2006.01)
*G06F 17/00* (2006.01)
*G06F 3/048* (2013.01)
*G06F 3/023* (2006.01)

(52) U.S. Cl.
CPC .................... *G06F 3/0233* (2013.01)

(58) Field of Classification Search
CPC ............. G06F 3/04886; G06F 17/276
See application file for complete search history.

(56) References Cited

U.S. PATENT DOCUMENTS

| 5,724,449 | A | * | 3/1998 | Cornerford | 382/230 |
| 5,963,671 | A | * | 10/1999 | Comerford et al. | 382/230 |
| 6,359,572 | B1 | * | 3/2002 | Vale | 341/23 |
| 6,562,078 | B1 | * | 5/2003 | Yang et al. | 715/202 |
| 7,587,378 | B2 | | 9/2009 | Van Meurs | |
| 8,504,349 | B2 | * | 8/2013 | Manu et al. | 704/1 |
| 2006/0141990 | A1 | * | 6/2006 | Zak et al. | 455/412.1 |
| 2008/0076472 | A1 | | 3/2008 | Hyatt | |
| 2008/0195571 | A1 | * | 8/2008 | Furuuchi et al. | 706/56 |
| 2009/0146848 | A1 | * | 6/2009 | Ghassabian | 341/22 |
| 2011/0007004 | A1 | * | 1/2011 | Huang et al. | 345/173 |
| 2012/0297332 | A1 | * | 11/2012 | Changuion et al. | 715/780 |

OTHER PUBLICATIONS

Harkins, "Automating dates and times in a Word document", TechRepublic [online]. Jan. 22, 2010. Retrieved from the Internet: <http://www.techrepublic.com/blog/microsoft-office/automating-dates-and-times-in-a-word-document/> 6 pgs.

* cited by examiner

*Primary Examiner* — Hyun Nam
(74) *Attorney, Agent, or Firm* — Shumaker & Sieffert, P.A.

(57) ABSTRACT

In one example, a computing device includes at least one processor configured to output, for display, a graphical keyboard. The at least one processor may be configured to output, for display, a graphical keyboard. The at least one processor may be configured to receive an input indication. The at least one processor may be configured to select, based in part on the input indication, keys of the graphical keyboard. The at least one processor may be configured to classify a group of characters associated with the keys into a category, wherein at least one of the group of characters comprises a number or a non-alphabetic symbol. The at least one processor may be configured to determine, based in part on a language model, candidate character strings that corresponds to the category. The at least one processor may be configured to output the at least one candidate character string.

23 Claims, 7 Drawing Sheets

WORD PREDICTION FOR NUMBERS AND SYMBOLS

BACKGROUND

Some computing devices (e.g., mobile phones, tablet computers) may provide a graphical keyboard as part of a graphical user interface for composing text (e.g., using a presence-sensitive input device and/or display, such as a touchscreen). The graphical keyboard may enable a user of the computing device to enter text (e.g., an e-mail, a text message, or a document). For instance, a display device of a computing device may output a graphical (or "soft") keyboard that enables the user to enter data by selecting (e.g., by tapping or gesturing) one or more keys of the graphical keyboard.

In some cases, the computing device may present a graphical keyboard with which the user interacts by tapping individual keys of the keyboard or essentially gesturing out a word by sliding his or her finger over the regions associated with the keys. In this way, graphical keyboards provide an input method that allows the user to enter characters, words, or a group of words by one or more gestures. As such, a graphical keyboard may allow the user to achieve a certain degree of efficiency by quickly and accurately entering text.

A computing device that provides a graphical keyboard may utilize word prediction, auto-correction, and/or suggestion techniques for determining a word from a user input. These techniques may speed up text entry and reduce mistakes of character strings in a predetermined vocabulary (e.g., a dictionary). One or more of the techniques may have certain drawbacks, however. For instance, in some examples, a computing device that provides a graphical keyboard and relies on one or more of the techniques may not correctly determine character strings with non-alphabetic characters (e.g., numbers, punctuation marks, or other symbols) that were intended by the user from user input. As such, a user may need to perform additional effort to enter characters and/or words that include numbers, punctuation marks, or other symbols.

SUMMARY

In one embodiment, the disclosure is directed to a method in which a computing device outputs for display, a graphical keyboard. The computing device receives an indication of input. The computing device selects, based at least in part on the indication of the input, one or more keys of the graphical keyboard. The computing device classifies a group of one or more characters associated with the one or more keys into a category, wherein at least one of the group of one or more characters comprises at least one of a number or a non-alphabetic symbol. The computing device determines, based at least in part on a language model, at least one candidate character string that corresponds to the category. The computing device outputs, for display, the at least one candidate character string.

In another embodiment, the disclosure is directed to a computing device configured to output, for display, a graphical keyboard, receive an indication of input, select, based at least in part on the indication of the input, one or more keys of the graphical keyboard, classify a group of one or more characters associated with the one or more keys into a category, wherein at least one of the group of one or more characters comprises at least one of a number or a non-alphabetic symbol, determine, based at least in part on a language model, at least one candidate character string that corresponds to the category, and output, for display, the at least one candidate character string.

In another embodiment, the disclosure is directed to a computer-readable medium containing instructions. The instructions cause a programmable processor to output, for display, a graphical keyboard, receive an indication of input, select, based at least in part on the indication of the input, one or more keys of the graphical keyboard, classify a group of one or more characters associated with the one or more keys into a category, wherein at least one of the group of one or more characters comprises at least one of a number or a non-alphabetic symbol, determine, based at least in part on a language model, at least one candidate character string that corresponds to the category, and output, for display, the at least one candidate character string.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
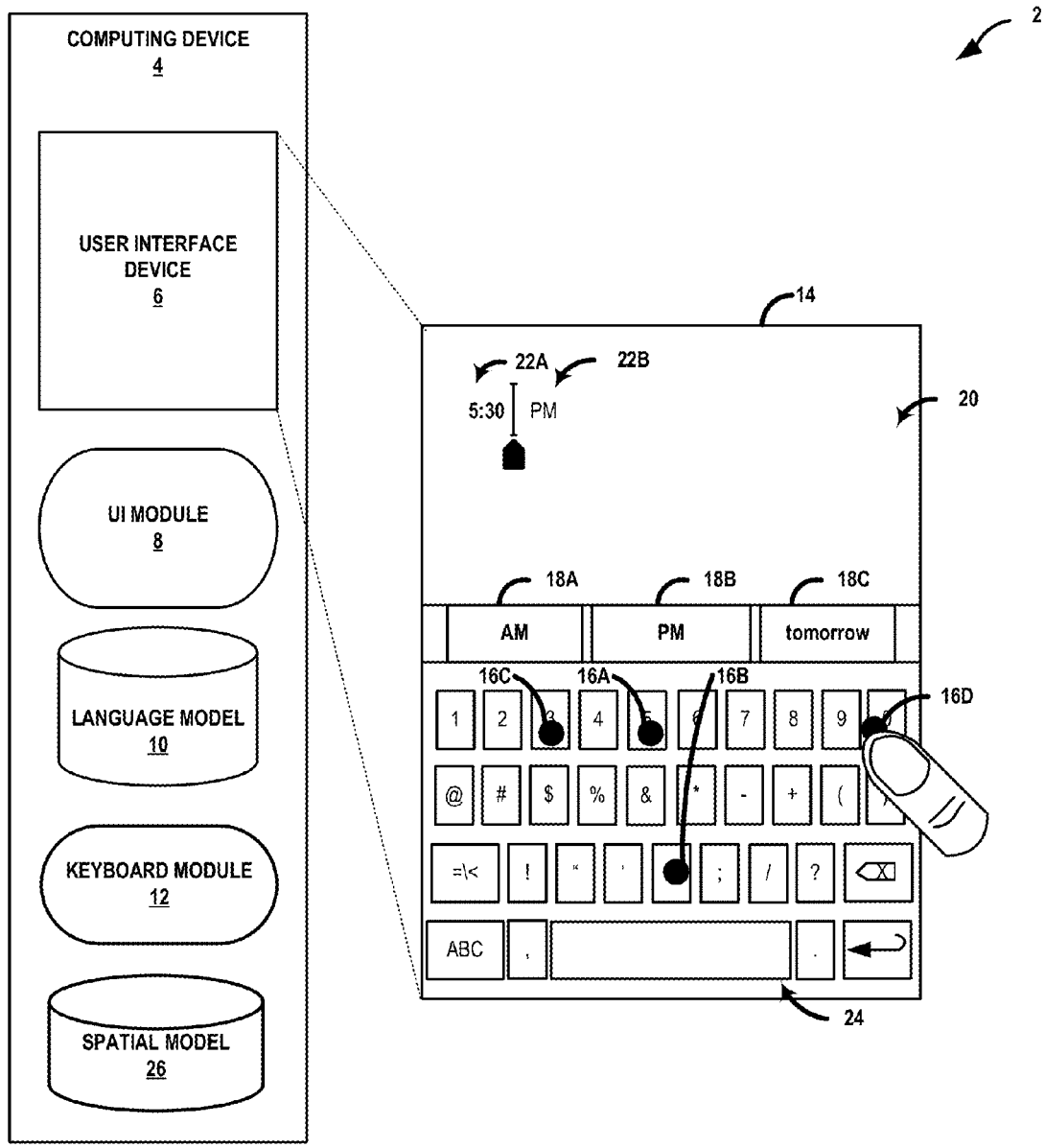
FIG. 1 is a block diagram illustrating an example computing device and graphical user interfaces (GUIs) for determining a string containing numbers or non-alphabetic symbols, in accordance with one or more aspects of the present disclosure.

In general, the current disclosure is directed to techniques for determining candidate character strings based on a previous input context (e.g., one or more character strings) that includes one or more numbers or non-alphabetic symbols. A previously inputted character string may be based on user input that selects one or more keys of a graphical keyboard. For instance, a computing device that outputs a graphical keyboard for display may receive indications of gestures or taps detected at a presence-sensitive input device. The computing device may determine, based on the indications of user input, a character string that includes characters, such as letters, numbers, and non-alphabetic symbols.

The techniques described herein may improve accuracy with which a computing device determines one or more candidate character strings when an inputted character string contains numbers or non-alphabetic symbols. For instance, some computing devices may not determine one or more candidate character strings based on numbers or non-alphabetic symbols contained within the inputted character string at all, or may always output the same next candidate character string based on the detection of a particular symbol or character string format without regard to a previous input context. These computing devices show the default predictions (i.e., "I", "the", "to") for any numbers or symbols inputted. The underlying assumption may be that numbers and symbols all belong to the unknown words. Therefore, the predictions for unknown words may be suggested when numbers or symbols are entered. In accordance with techniques of the present disclosure, rather than determining a candidate character string based merely on the presence of a number or symbol in a character string, techniques of the disclosure may use a language model to determine a candidate character string based on a previous input context that includes the numbers or non-alphabetic symbols and/or one or more additional, previously inputted characters.

As one example, using techniques of the disclosure, a computing device may initially receive an indication of user input. Based on the indication of user input, the computing device may determine a selection of keys of a graphical keyboard that correspond, respectively to '1'-'0'-'%.' The computing device may classify a character string that includes "10%" into a category. The category may correspond to character strings that include a '%' character and include a value preceding the '%' character that is between 0-50. The computing device may also include a category that corresponds to character strings that include a '%' character and include a value preceding the '%' character that is between 51-100. Using a language model and the corresponding category, the computing device may determine candidate character strings "higher," "greater," and "of," which have higher frequencies or probabilities in the language model based on the previous input context that includes "10%." The computing device may output one or more of the candidate character strings for display. In an alternative example, if the character string includes "90%," the computing device may use a different category corresponding to "90%" to determine candidate character strings "lower," "less," and "of." This set of candidate words may have higher frequencies in the language model based on the category for the previous input context that includes "90%." In this way, techniques of the disclosure may enable the computing device to more accurately determine candidate character strings based on the previous input context using a language model, rather than using the same next candidate character string based on the detection of a particular symbol or character string format without regard to a previous input context.

To further illustrate, if a percentage is detected, the language model may determine candidate character strings such as "higher," "lower," "of," "floor," or "ceiling," among other things. If a time is detected, the language model may determine candidate character strings such as "AM," "PM," "today," "tomorrow," "Wednesday," or "tonight," among other things. If an '@' symbol is detected, the user may be trying to enter an e-mail address, so domains, such as "gmail.com," "yahoo.com," "hotmail.com," or "school.edu," among other things, may be output by the computing device. If an arbitrary number is detected, the computing device may output candidate character strings such as "dollars," "things," "places," "people," "pounds," or "days," among other things. These are just a few examples of formats that could be detected by the existence of the categories and the updated language models. To take advantage of this observation and to make the keyboards more predictive, the keyboard word prediction may be expanded to numbers and symbols: the keyboard predicts the words after a user enters numbers or symbols. More specifically, numbers and symbols are classified into the categories, and the keyboard predicts the word completions and future words accordingly.

In other examples, such computing devices may predict a word to follow these character strings that contain numbers or non-alphabetic symbols based on a default setting that will output generic candidate character strings if the character string is not recognized by the dictionary. In one example, using techniques of the disclosure, a computing device initially determines a plurality of keys of a graphical keyboard based on an indication of a gesture detected at a presence-sensitive display. Based on a spatial model score and a language model score, the computing device outputs a character string. This character string contains a number or a non-alphabetic symbol, such as '@', ':' or '%'. If it is determined that the character string does contain a number or a non-alphabetic symbol, the character string is classified into a category. This classification may be done by a series of regular expressions or literal string comparisons. If the computing device determines that the character string containing a number or a non-alphabetic symbol is included within one of the categories, the language model may dynamically update to include possible candidate character strings that fit within the chosen category. The computing device may use the language model to determine the rest of the character string that contains a number or non-alphabetic symbol to determine the best candidate character strings for a next word for the given input. These candidate character strings may be predicted from heuristics. In one example, a computing device may obtain the frequencies of candidate character strings following numbers and symbols by analyzing users' input histories, and provides predictions based on the obtained bigram frequencies.

FIG. 1 is a block diagram illustrating an example computing device and graphical user interface (GUI) for determining a string containing numbers or non-alphabetic symbols, in accordance with one or more aspects of the present disclosure. In the example system 2 of FIG. 1, computing device 4 may be a mobile phone. However, in other examples, computing device 4 may be a tablet computer, a personal digital assistant (PDA), a laptop computer, a portable gaming device, a portable media player, an e-book reader, a watch, television platform, or another type of computing device.

As shown in FIG. 1, computing device 4 includes a user interface device 6. User interface device 6 of computing device 4 may function as an input device for computing device 4 and as an output device. In some examples, user interface device 6 may include an integrated presence-sensitive input device and a display device. For instance, user interface device 6 may function as a presence-sensitive input device using a presence-sensitive screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive screen technology. User interface device 6 may function as an output device using any one or more of a liquid crystal display (LCD), dot matrix display, light emitting diode (LED) display, organic light-emitting diode (OLED) display, e-ink, or similar monochrome or color display capable of outputting visible information to the user of computing device 4.

While illustrated as an internal component of computing device 4, user interface device 6 may also represent an external component that shares a data path with other components of computing device 4 for transmitting and/or receiving input and output. For instance, in one example, user interface device 6 represents a built-in component of computing device 4 located within and physically connected to the external packaging of computing device 4 (e.g., a screen on a mobile phone). In another example, user interface device 6 may be an external component of computing device 4 located outside and physically separated from the packaging of computing device 4 (e.g., a monitor, a projector, etc. that shares a wired and/or wireless data path with a tablet computer).

User interface device 6 of computing device 4 may include a presence-sensitive screen that may detect user input from a user of computing device 4. User interface device 6 may determine indications of the user input in response to detecting one or more tap and/or non-tap gestures, and/or continuous gestures, from a user of computing device 4 (e.g., the user touching or pointing to one or more locations of user interface device 6 with a finger or a stylus pen). In some examples, an indication of user input may be defined by data indicating one or more (x,y) coordinates corresponding to a location of the user input at user interface device 6, a time that the user input was detected, an action detected (e.g., touch down, touch up, etc). The presence-sensitive screen of user interface device 6 may present output to a user. User interface device 6 may present various user interfaces of applications (e.g., an electronic message application, an Internet browser application, an operating system, etc.) executing at computing device 4. A user of computing device 4 may interact with one or more of these applications to perform a function with computing device 4 through the respective user interface of each application.

Computing device 4 may include user interface ("UI") module 8 and keyboard module 12. Modules 8 and 12 may perform operations described herein using software, hardware, firmware, or a mixture of both hardware, software, and firmware residing in and executing on computing device 4. Computing device 4 may execute modules 8 and 12, with multiple processors. Computing device 4 may execute modules 8 and 12 in a virtual machine executing on underlying hardware. Modules 8 and 12 may be implemented in various ways. For example, UI module 8 and/or keyboard module 12 may be implemented as a downloadable or pre-installed application or "app." In another example, UI module 8 and/or keyboard module 12 may be implemented as part of an operating system of computing device 4.

UI module 8 of computing device 4 may receive from user interface device 6, one or more indications of user input detected user interface device 6. In some examples, each time user interface device 6 detects a user input, UI module 8 may receive information about the user input, such as one or more indications of user input, from user interface device 6. UI module 8 may assemble the information received from user interface device 6 into a time-ordered set of events indicative of a gesture, such as a sequence of touch events. Each touch event in the sequence may include data or components that represents parameters (e.g., when, where, originating direction) characterizing a presence and/or movement of input at the presence-sensitive screen. Each touch event in the sequence may include a location component corresponding to a location of user interface device 6, a time component related to when user interface device 6 detected user input at the location, and an action component related to whether the touch event corresponds to a lift up or a push down at the location. Moreover, one or more of the events may have a concurrent time component, and such events are described as touch events merely for purposes of example and may be indicative of a gesture at any form of presence-sensitive input device.

UI module 8 may determine one or more characteristics of the user input based on the sequence of touch events and include information about these one or more characteristics within each touch event in the sequence of touch events. For example, UI module 8 may determine a start location of the user input, an end location of the user input, a density of a portion of the user input, a speed of a portion of the user input, a direction of a portion of the user input, and a curvature of a portion of the user input. One or more touch events in the sequence of touch events may include (in addition to a time, a location, and an action component as described above) a characteristic component that includes information about one or more characteristics of the user input (e.g., a density, a speed, etc.). UI module 8 may transmit, as output to keyboard module 12, the sequence of touch events including the components or parameterized data associated with each touch event.

UI module 8 may act as an intermediary between various components of computing device 4 to make determinations based on input detected by user interface device 6 and generate output presented by user interface device 6. For instance, UI module 8 may receive information from keyboard module 12 that includes a representation of a keyboard layout of the keys included in graphical keyboard 24. UI module 8 may generate touch events based on information about user input detected by user interface device 6. UI module 8 may determine, based on the location components in the sequence touch events that one or more location components approximate a selection of one or more keys (e.g., UI module 8 may determine the location of one or more of the touch events corresponds to an area of user interface device 6 that presents graphical keyboard 24). UI module 8 may transmit, as output to keyboard module 12, the sequence of touch events along with locations where user interface device 6 presents each of the keys. In response, UI module 8 may receive, as an input from keyboard module 12, a character string and one or more suggested words. UI module 8 may update user interface 14 to include the character string within edit region 20 and one or more suggested words associated with the character string within suggested word region 18A-18C. UI module 8 may cause user interface device 6 to present the updated user interface 14.

Computing device 4, in some examples, includes language model 10. Language model 10 may include a lexicon. In some examples, a lexicon may include a listing of words and may include additional information about the listed words. A lexicon may be represented by any one or more data structures, such as an array, a list, and/or a tree. For example, language model 10 may include a lexicon stored in a trie data structure. A lexicon trie data structure may contain a plurality of nodes, each node may represent a letter, a number, or a non-alphabetic symbol. The first node in a lexicon trie may be called the entry node which may not correspond to a letter, a number, or a non-alphabetic symbol. In other examples, the entry node may correspond to a letter, a number, or a non-alphabetic symbol. Each node may have one or more child nodes. For instance, the entry node may have twenty-six child nodes, each corresponding to a letter of the English alphabet. The entry node may also have child nodes corresponding to numbers 0-9 or non-alphabetic symbols, such as '@', '#', ':', '%', and '/', among other symbols.

A subset of the nodes in a lexicon trie may each include a flag which indicates that the node is a terminal node. Each terminal node of a lexicon trie may indicate a complete word (e.g., a candidate word). The characters indicated by the nodes along a path of nodes from the entry node to a terminal node may spell out a word indicated by the terminal node. In some examples, language model 10 may be a default dictionary installed on computing device 4. In other examples, language model 10 may include multiple sources of lexicons, which may be stored at computing device 4 or stored at one or more remote computing devices and are accessible to computing device 4 via one or more communication channels.

In some examples, language model 10 may be implemented in the firmware of computing device 4. Language model 10 may include language model frequency information such as n-gram language models. An n-gram language model may provide a probability distribution for an item $x_i$ (letter, word, number, or non-alphabetic symbol) in a contiguous sequence of items based on the previous items in the sequence (i.e., $P(x_i | x_{i-(n-1)}, \ldots, x_{i-1})$). For instance, a bigram language model (an n-gram model where n=2), may provide a probability that the letter "w" follows the sequence "no". In some examples, language model 10 includes a lexicon trie with integrated language model frequency information. For instance, each node of the lexicon trie may include a representation of a letter, a number, or a non-alphabetic symbol and a probability value.

In some examples, language model 10 may define one or more different categories. A category in language model 10 may specify a group of ordered or unordered string-frequency pairs, where each pair includes a string and a corresponding frequency. In some examples, a string-frequency pair may include a word from a dictionary as the string and a frequency of that word. The frequency of the word may be based on particular input context, wherein the input context may be based on one or more of: one or more previously inputted words, one or more previously inputted characters, an input field type, an identity of the user entering the text, time, location, application receiving the input, recipient of the inputted text, or any other contextual information. The frequency may be based on a raw value that indicates frequency with which the word occurs in a written language. In some examples, the frequency of the word may be based on a combination of the input context and the frequency with which the word occurs in a written language. In some examples, the input context may change over time, in which case the word frequencies may change. In some examples, the frequency of a word in a string-frequency pair for a first category may be different than the frequency of the same word in a string-frequency pair for a second category. In this way, different categories may specify different word frequencies for the same word.

Each category may correspond to a different string format that include one or more numbers and/or non-alphabetic symbols. In some examples, categories may correspond to formats that include but are not limited to: times, dates, arbitrary numbers, addresses, e-mail addresses, percentages, uniform resource locators (URLs), or number symbols. In some examples, these categories (e.g., parent categories) may be further broken down into sub-categories (e.g., child categories). For instance a sub-category may be a subset of a category. For instance, the "time" category (e.g., parent category) may be broken down into four different sub-categories: times falling between 12:00 and 2:59, times falling between 3:00 and 5:59, times falling between 6:00 and 8:59, and times falling between 9:00 and 11:59. In another example, the "percentage" category could be broken down into five different sub-categories based on what percentage is entered: a percentage less than 50%, 50% exactly, a percentage greater than 50% but less than 100%, 100% exactly, or a percentage greater than 100%. Sub-categories that share a common input context may be grouped within a category, for instance, as predictions associated with those contexts may also be similar. In another example, a category may not include one or more sub-categories.

In some examples, each category and/or sub-category may correspond to one or more string patterns. In some examples, a string pattern may identify a category or sub-category. A string pattern may be a set of literal characters. For instance, a string pattern may be "50%". In one example, an input string determined based on user input and comprising the characters "50%" may match the string pattern "50%." The string pattern "50%" may correspond to a particular category. Therefore, keyboard module 12, upon determining an input string that includes "50%" may use the string-frequency pairs in language model 12 that are based on the category corresponding to the string pattern "50%."

In other examples, a string pattern may include a one or more metacharacters that serve as wild card values, where a wildcard value can represent a group of possible literal characters. A string pattern may specify a combination of one or more metacharacters and one or more literal characters. In some examples, a string pattern that specifies ^([1-9]|([1][0-2])):([0-5][0-9])$ may determine if an input string matches a valid value of hours and minutes of time. If the input string matches the string pattern, the input string may correspond to the category associated with the string pattern. In some examples, if an input string matches a string pattern for a category, keyboard module 12 may use the string-frequency pairs in language model 12 that are based on the category. For instance, if an input string matches a string pattern for time, keyboard module 12 may determine the category corresponding to the string pattern and determine string-frequency pairs based on the category.

Each category or sub-category defined for language model 10 may have a different group of string-frequency pairs as described above that keyboard module 12 may use for word completion based on previous input or predicting a next word to follow a string based on previous input. In some examples, if keyboard module 12 receives an input value and determines that it corresponds to a time category, keyboard module 12 may further determine that the input value corresponds to a time sub-category that includes input values between "12:00 to 2:59." Keyboard module 12 may use string-frequency pairs from language model 10 that are based on the identified time sub-category in which the candidate character string "PM," "this afternoon," or "today" have higher respective frequencies than "AM," "tomorrow morning," or "in the morning." However, if a different input value falls within the "9:00 to 11:59" sub-category (e.g., the input value matches a string pattern for values between "9:00 to 11:59" and the corresponds to), keyboard module 12 may use string frequency pairs from language model 10 that are based on the "9:00 to 11:59" sub-category in which the candidate character strings "AM," "tomorrow morning," or "in the morning" have higher respective frequencies than "PM," "this afternoon," or "today."

In another example, if the category is a percentage, and an input value representing a percentage (e.g., "35%") falls in the "<50%" sub-category, keyboard module 12 may use string-frequency pairs from language model 10 based on the "<50%" sub-category in which the candidate character strings "higher," "greater than," or "of" may have higher respective frequencies than "lower," "less than," or "of." However, if the percentage falls in the "≥50%" sub-category, keyboard module 12 may use string-frequency pairs from language model 10 based on the "≥50%" sub-category in which the candidate character strings "lower," "less than," or "of" may have higher respective frequencies than "higher," "greater than," or "of." In some examples, if a particular user associates a particular word with a category, language model 10 may update the probabilities or frequency scores associated with that particular word in conjunction with that specific category.

In the example of FIG. 1, UI module 8 may cause user interface device 6 to output example user interface 14. In this example, user interface 14 includes graphical elements displayed at various locations of user interface device 6. FIG. 1 illustrates edit region 20 of user interface 14, graphical keyboard 24 of user interface 14, and suggested word regions 18A-18C. Edit region 20 may include graphical elements such as images, objects, hyperlinks, characters of text, etc. Graphical keyboard 24 includes graphical elements displayed as keys. Suggested word regions 18A, 18B, and 18C may include suggested words that represent selectable spelling corrections or word suggestions to replace or complete character strings that are included in edit region 20. The words of suggested word regions 18A-18C may be based at least in part on the output of language model 10. Suggested word regions 18A, 18B, and 18C may also include suggested words to follow character strings that are already included in edit region 20. In the example of FIG. 1, edit region 20 includes graphical elements displayed as strings 22A and 22B. Particularly, in the example of FIG. 1, string 22A consists of text entered by the user. Upon receiving a user input to select the string at suggested word region 18B, graphical user interface 14 may include string 22B, which may be a suggested next word based on the contents of suggested word region 18B. In some examples, a suggested next word may be a character string that follows a previously inputted character string, where the previously inputted character string is comprised of characters based on previous user input. The suggested next word may be separate from a previously inputted string such that the suggested next word may not be included in the string that comprises the previously inputted string; however, the suggested next word may be determined based on the previously inputted string. For instance, a suggested next word may be separated by a space from a previously inputted character string. A suggested next word may represent a new word that is not a part of the previously inputted character string. In some examples, suggested next word may be "PM" and the previously inputted character string may be "5:30". A user of computing device 4 may enter text in edit region 20 by providing user input at locations of user interface device 6 that display the keys of graphical keyboard 24 and/or at edit region 20.

Keyboard module 12 of computing device 4 may transmit, as output to UI module 8 (for inclusion as graphical keyboard 24 of user interface 14) a keyboard layout including a plurality of keys related to one or more written languages (e.g., English, Spanish, etc.). Keyboard module 12 may assign one or more characters or operations to each key of the plurality of keys in the keyboard layout. For instance, keyboard module 12 may generate a QWERTY keyboard layout including keys that represent characters used in typing the English language. The QWERTY keyboard layout may also include keys that represent operations used in typing the English language (e.g., backspace, delete, spacebar, enter, etc.). In another example, keyboard module 12 may generate a keyboard layout including keys that represent numbers 0-9 or non-alphabetic symbols, such as '@', '#', ':', '%', and '/', among other symbols.

Keyboard module 12 may receive data from UI module 8 that represents the sequence of touch events. The touch events may include data representing locations of the presence-sensitive screen of user interface device 6 where user interface device 6 presents each of the keys of graphical keyboard 24. Keyboard module 12 may determine, based on the locations of the keys that the sequence of touch events represents a selection of one or more keys.

To determine one or more keys corresponding to the sequence of touch events, keyboard module 12 may use one or more spatial models, such as spatial model 26. In general, keyboard module 12 may use spatial model 26 to generate one or more probabilities that one or more particular keys of a graphical keyboard have been selected based on location data associated with a user input. In some examples, spatial model 26 includes a bivariate Gaussian model for each key. The bivariate Gaussian model for a key may include a distribution of coordinates (e.g., (x,y) coordinate pairs) that correspond to locations of user interface device 6 that present the given key. More specifically, in some examples, a bivariate Gaussian model for a key may include a distribution of coordinates that correspond to locations of user interface device 6 that are most frequently selected by a user when the user intends to select the given key. The shorter the distance between location data of a user input and a higher density area of spatial model 26, the higher the probability that the key associated with spatial model 26 has been selected. A greater distance between location data of a user input and a higher density area of spatial model 26, the lower the probability that the key associated with spatial model 26 has been selected.

Keyboard module 12 may use spatial model 26 to compare the location components (e.g., coordinates) of one or more touch events in the sequence of touch events to respective locations of one or more keys of graphical keyboard 24 and generate a probability based on these comparisons that a selection of a key occurred. In some examples, keyboard module 12 may generate a spatial model score using spatial model 26. The spatial model score may indicate a probability of a selected key based at least in part on locations of user interface device 6 traversed by a tap or continuous gesture. In some examples, a spatial model score may indicate a combined probability of a group of selected keys based at least in part on locations of UI device 14 traversed by a gesture.

Keyboard module 12 may use spatial model 26 to compare the location component of each touch event in the sequence of touch events to a key location of a particular key of graphical keyboard 24. The location component of each touch event in the sequence may include one location of user interface device 6. A key location (e.g., a centroid of a key) of a key in graphical keyboard 24 may include a different location of user interface device 6. Keyboard module 12 may use spatial model 26 to determine a Euclidian distance between the two locations and generate a probability based on the Euclidian distance that the key was selected. Spatial model 26 may indicate a higher probability for a key that shares a smaller Euclidian distance with one or more touch events than a key that shares a greater Euclidian distance with one or more touch events. Based on the spatial model probability associated with each key, keyboard module 12 may assemble the individual key selections with the highest spatial model probabilities into a time-ordered sequence of keys with corresponding characters that keyboard module 12 may then determine represents a character string. The combined probabilities of each key with associated with a character in the character string may represent a spatial model score for the character string. As further described below, keyboard module 12 may determine for a touch event, probabilities corresponding to multiple keys that are proximate to the location of the touch event. That is, if the touch event indicated a location proximate to the '%' key of graphical keyboard 24, keyboard module 12 may determine a spatial probability that the '%' key was selected, and may also determine spatial model probabilities that the '$' key and '4' key were selected. The spatial model probability for "%" may be higher than either of "$" and "4".

Keyboard module 12 may use a language model 10 to determine one or more candidate character strings that correspond to sequences of keys indicated by touch events. The candidate character strings may represent characters of different possible sequences of keys indicated by the touch events. As keyboard module 12 receives indications of user input, keyboard module 12 may concurrently determine one or more characters and/or words of a language based on the candidate character strings. Keyboard module 12 may access language model 10 to predict and/or autocorrect words that are output for display at user interface device 6.

Techniques of the present disclosure may determine, in a probabilistic manner, candidate characters and/or candidate character strings based on user input that includes one or more numbers or non-alphabetic symbols. For instance, computing device 4 may determine such numbers or non-alphabetic symbols based on indications of user input. The user may input the text containing numbers or non-alphabetic symbols using a graphical keyboard that includes keys corresponding to characters of numbers or non-alphabetic symbols. By probabilistically determining next characters and/or words to follow the input of numbers or non-alphabetic symbols in accordance with the techniques of the disclosure, such techniques may reduce the amount of user effort to enter such characters and/or words when the user has tapped or gestured one or more keys.

For example purposes, the techniques are further described in detail with reference to FIG. 1. In the example of FIG. 1, computing device 4 outputs for display graphical keyboard 24 comprising a plurality of keys. For example, keyboard module 12 may generate data that includes a representation of graphical keyboard 24. UI module 8 may generate data that includes a representation of user interface 14 and that includes graphical keyboard 24 in user interface 14 based on the data representing graphical keyboard 24. UI module 8 may send data to user interface device 6 that includes instructions for displaying user interface 14 at user interface device 6. User interface device 6 may receive the data and cause user interface device 6 to present user interface 14 including edit region 20, graphical keyboard 24, and suggested word region 22B.

Computing device 4 may receive an indication of input. For instance, keyboard module 12 may receive one or more indications of input in FIG. 1 when a user performs a series of tap inputs at input locations 16A-16D. Each of tap locations 16A-16D are indicated by solid circles in FIG. 1 for example purposes, although user interface device 6 may not output such solid circles in some examples, and such portions may be larger and/or smaller in various different examples. For example, the user may wish to enter a time comprising representations for "5:30." As shown in FIG. 1, keyboard module 12 may receive one or more indications of user input representing the key sequence '5'-':'-'3'-'0.'

In some examples, keyboard module 12 may select, based on one or more indications of the input, one or more keys of the graphical keyboard 24. For instance, as described above, keyboard module 12 may determine locations at user interface device 6 at which the input were detected by user interface device 6. Based on the locations, keyboard module 12 may use spatial model 26 and/or language model 10 to determine probabilities for respective keys of graphical keyboard 24 that are at or near the locations at which the input were detected. Keyboard module 12 may determine one or more groups of characters that correspond to one or more groups of keys. For instance, keyboard module 12 may determine a group of characters that includes '5', ':', '3', '0'. Keyboard module 12 may determine another group of characters '5', ':', '3', '9'. Each group of characters may represent characters that are respectively associated with keys that are at or near a location of user input detected at user interface device 6.

In accordance with techniques of this disclosure, keyboard module 12 may classify a group of one or more characters associated with the one or more keys of graphical keyboard 24 into a category, wherein at least one of the group of one or more characters comprises at least one of a number or a non-alphabetic symbol. For instance, keyboard module 12 may determine a category that corresponds to a group of one or more characters by comparing the group of one or more characters to one or more regular expressions. A regular expression may represent one or more string patterns. For example, keyboard module 12 may compare string 22A (e.g., the group of characters "5:30") to the regular expression "^([1-9]|([1][0-2])):([0-5][0-9])$" that is associated with time. Keyboard module 12 may use this regular expression to determine if string 22A is in the form of h:mm or hh:mm. If string 22A (e.g., "5:30") matches the regular expression, keyboard module 12 determines a category that corresponds to the regular expression. In this way, keyboard module 12 may classify string 22A into the category that corresponds to the matching regular expression. As described above, the category may correspond to a group of one or more string-frequency pairs in language module 10 that keyboard module 12 may use determine what candidate character strings are output in text suggestion fields 18A, 18B, and 18C.

Keyboard module 12, in some examples, may further compare string 22A (e.g., "5:30") to one or more regular expressions to determine a sub-category for string 22A. For instance, upon determining that the string 22A (e.g., "5:30") is a time, keyboard module 12 may compare the string 22A to four regular expressions: "^(([1][2])|([1][:])|[2])", "^[3-5]", "^[6-8]", and "^([9]|([1][0])|([1][1]))". Keyboard module 12 may determine which of the four regular expressions matches the format of the string 22A. Keyboard module 12 may further use this sub-category to determine frequencies for candidate character strings to display in text suggestion regions 18A, 18B, and 18C. In some examples, keyboard module 12 may use regular expressions to determine if the string 22A is a date, an arbitrary number, an address, an e-mail address, a percentage, a uniform resource locator, or a number symbol.

Keyboard module 12 may determine, based at least in part on language model 10, at least one candidate character string that corresponds to the category. For instance, as described above, if an input string, such as string 22A, matches a string pattern for a category, keyboard module 12 may use the string-frequency pairs in language model 12 that are based on the category. In the example of FIG. 1, keyboard module 12 may determine string-frequency pairs that include the respective strings "AM," "PM," and "tomorrow." These respective strings may each be candidate character strings. In some examples, these respective candidate character strings may have the three highest, respective frequency values in a group of string-frequency pairs in language model 10 for the determined category. In other words, "AM," "PM," and "tomorrow" may be the three most probable candidate character strings based the input string "5:30" that corresponds to the determined category for time.

In some examples, keyboard module 12 may cause user interface device 6 to output for display, the at least one candidate character string. For instance, UI module 8 may receive data indicating one or more candidate character strings from keyboard module 12 and update suggested word regions 18A-18C. For instance, word suggestion region 18A may include the second-highest ranking candidate character string as suggested word "AM". UI module 8 may update suggested word region 18B to include the highest ranking candidate character string as suggested word "PM". As the highest ranking candidate character string, this candidate character string would also be displayed in portion 22B of edit region 20. A higher ranking word has a higher probability or frequency of being the desired candidate character string than a lower ranking word which has a lower probability or frequency. UI module 8 may update suggested word region 18C by including the third highest ranking candidate character string as suggested word "tomorrow". The user may use provide a user input at the user interface device 6 to select one of suggested text regions 18A, 18B, or 18C, which would cause user interface device 6 to output the corresponding candidate character string in portion 22B of edit region 20.

In this way, the techniques of the disclosure may enable a computing device to output characters and/or words as suggested next words when the user has entered numbers or non-alphabetic symbols. For instance, in the above example, the user may have intended to type a time into the computing device. Rather than suggest default candidate character strings when the word contains numbers or non-alphabetic symbols, the techniques of the disclosure may enable a computing device to determine an input context of and to suggest characters and/or words that a user would likely type in accordance with that input context. As such, the techniques may enable a user to more quickly enter text at a computing device using a keyboard when the input contains numbers or non-alphabetic symbols. Since the user may provide fewer inputs the computing device while entering text, computing device implementing techniques of the disclosure may execute fewer operations, and as a result, consume less electrical power.

Figure 2:
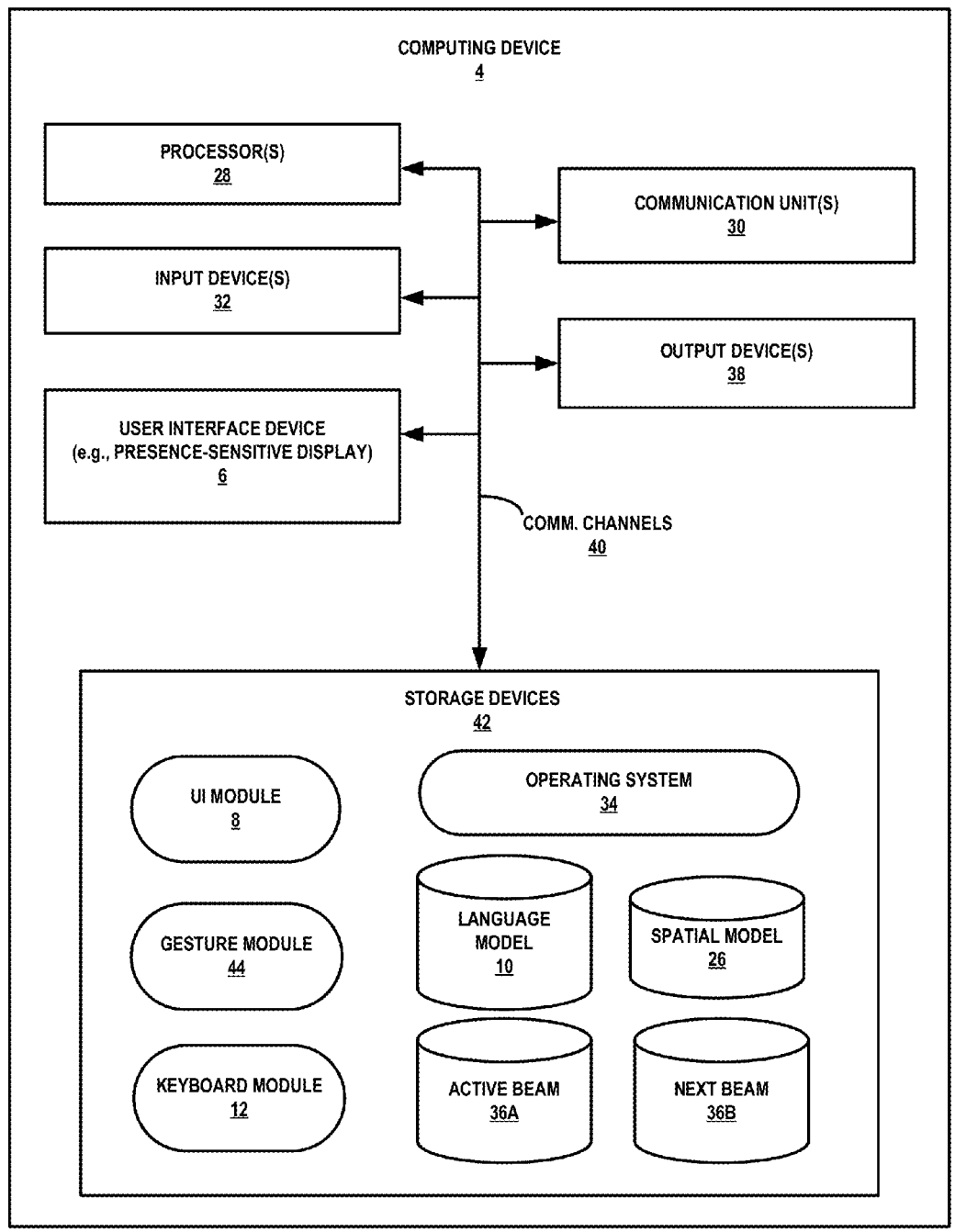
FIG. 2 is a block diagram illustrating further details of an example computing device for providing text input, in accordance with one or more aspects of the present disclosure.

FIG. 2 is a block diagram illustrating an example computing device 4 of FIG. 2 is described below within the context of FIG. 1. FIG. 2 illustrates only one particular example of computing device 4, and many other examples of computing device 4 may be used in other instances and may include a subset of the components included in example computing device 4 or may include additional components not shown in FIG. 2.

Computing device 4 can include additional components that, for clarity, are not shown in FIG. 2. For example, computing device 4 can include a battery to provide power to the components of computing device 4. Similarly, the components of computing device 4 shown in FIG. 2 may not be necessary in every example of computing device 4. For example, in some configurations, computing device 4 may not include communication unit 30.

In the example of FIG. 2, computing device 4 includes user interface device 6 (e.g., a presence-sensitive display), one or more processors 28, one or more input devices 32, one or more communication units 30, one or more output devices 38, and one or more storage devices 42. Storage devices 42 of computing device 4 also include UI module 8, keyboard module 12, gesture module 44, spatial model 26, language module 28, correction data 30, operating system 34, active beam 36A, and next beam 36B. Communication channels 40 may interconnect each of the components 6, 28, 30, 32, 38, 42, 8, 10, 12, 26, 44, 34, 36A, and 36B for inter-component communications (physically, communicatively, and/or operatively). In some examples, communication channels 40 may include a system bus, a network connection, an inter-process communication data structure, or any other construct for communicating data.

One or more communication units 30 of computing device 4 may communicate with external devices via one or more networks by transmitting and/or receiving network signals on the one or more networks. For example, computing device 4 may use communication unit 30 to transmit and/or receive radio signals on a radio network such as a cellular radio network. Likewise, communication units 30 may transmit and/or receive satellite signals on a satellite network such as a GPS network. Examples of communication unit 30 include a network interface card (e.g. such as an Ethernet card), an optical transceiver, a radio frequency transceiver, a GPS receiver, or any other type of device that can send and/or receive information. Other examples of communication units 30 may include Bluetooth®, GPS, 3G, 4G, and Wi-Fi® radios found in mobile devices as well as Universal Serial Bus (USB) controllers.

One or more input devices 32 of computing device 4 may receive input. Examples of input are tactile, audio, and video input. Input devices 32 of computing device 4, in one example, includes a mouse, keyboard, voice responsive system, video camera, microphone or any other type of device for detecting input from a human or machine. In some examples, input device 32 may be a presence-sensitive input device, which may include presence-sensitive screen, touch-sensitive screen, etc.

One or more output devices 38 of computing device 4 may generate output. Examples of output are tactile, audio, and video output. Output devices 38 of computing device 4, in one example, includes a presence-sensitive screen, sound card, video graphics adapter card, speaker, cathode ray tube (CRT) monitor, liquid crystal display (LCD), or any other type of device for generating output to a human or machine. Output devices 38 may include display devices such as cathode ray tube (CRT) monitor, liquid crystal display (LCD), or any other type of device for generating visual output.

In some examples, user interface device 6 of computing device 4 may include functionality of input devices 32 and/or output devices 38. In some examples, user interface device 6 provides output to a user using tactile, audio, or video stimuli as described with respect to output device 38. In the example of FIG. 2, user interface device 6 presents a user interface, such as user interface 14 of FIG. 1.

One or more storage devices 42 within computing device 4 may store information for processing during operation of computing device 4. In some examples, storage device 42 is a temporary memory, meaning that a primary purpose of storage device 42 is not long-term storage. Storage devices 42 on computing device 4 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 42, in some examples, also include one or more computer-readable storage media. Storage devices 42 may be configured to store larger amounts of information than volatile memory. Storage devices 42 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 42 may store program instructions and/or data associated with UI module 8, keyboard module 12, gesture module 44, spatial model 26, language module 28, active beam 36A, next beam 36B, and operating system 34.

One or more processors 28 may implement functionality and/or execute instructions within computing device 4. For example, processors 28 on computing device 4 may receive and execute instructions stored by storage devices 42 that execute the functionality of UI module 8, keyboard module 12, gesture module 44, spatial model 26, language module 28, active beam 36A, next beam 36B, and operating system 34. These instructions executed by processors 28 may cause computing device 4 to store information, within storage devices 42 during program execution. Processors 28 may execute instructions of UI module 8, keyboard module 12, gesture module 44, spatial model 26, language module 28, active beam 36A, next beam 36B, and operating system 34 to cause user interface device 6 to display user interface 14. That is, items in storage device 42, such as UI module 8, keyboard module 12, gesture module 44, spatial model 26, language module 10, active beam 36A, next beam 36B, and operating system 34, may be operable by processors 28 to perform various actions, including receiving an indication of a gesture at locations of the presence-sensitive screen of user interface device 6 and causing user interface device 6 to graphical keyboard 24, as shown in FIG. 1.

In some examples, the one or more processors 28 may execute instructions for outputting, by computing device 4 and for display, a graphical keyboard. The instructions may cause the one or more processors to receive, by computing device 4, an indication of input, such as tap gestures 16A-16D, as shown in FIG. 1. The instructions may cause the one or more processors to select, by computing device 4 and based at least in part on the indication of the input, one or more keys of the graphical keyboard. The instructions may cause the one or more processors to classify, by computing device 4, a group of one or more characters associated with the one or more keys into a category, wherein at least one of the group of one or more characters comprises at least one of a number or a non-alphabetic symbol. The instructions may cause the one or more processors to determine, by computing device 4 and based at least in part on a language model, such as language model 10, at least one candidate character string that corresponds to the category. The instructions may cause the one or more processors to output, by computing device 4 and for display, the at least one candidate character string. In other examples, the one or more processors may execute other instructions in accordance with techniques of this disclosure.

Computing device 4 may include operating system 34. Operating system 34, in some examples, controls the operation of components of computing device 4. For example, operating system 34, in one example, facilitates the communication of UI module 8, gesture module 44, and keyboard module 12 with processors 28, communication unit 30, storage device 42, input device 32, and output device 38.

Computing device 4 may include active beam 36A. Active beam 36A, in some examples, is configured to store one or more tokens generated by keyboard module 12, as described later herein. Active beam 36A may be included within storage devices 42. Computing device 2 may also include next beam 36B. Next beam 36B, in some examples, is configured to store one or more tokens generated by keyboard module 12. Next beam 36B may be included within storage devices 42. In some examples, active beam 36A could be a group of one or more characters associated with one or more keys of a graphical keyboard, such as keyboard module 12, that are based on an indication of input received by computing device 4. In some examples, next beam 36B could include portions of and/or complete candidate character strings that are determined at least in part by a language model, such as language model 10, and output by computing device 4 for display, such as at edit region 20, as shown in FIG. 1.

Gesture module 44 may use spatial model 26 and language model 10 to determine one or more candidate character strings by determining a composite cost value for each of at least two keys of the plurality of keys, and comparing the respective composite cost values for each of at least two keys, as further described below. In some examples, computing device 4 may store tokens in active beam 36A and next beam 36B, wherein each token includes at least a portion of a candidate character string (e.g., a word prefix) and a corresponding composite cost value. Computing device 4 may incrementally update the candidate character string and composite cost value of respective tokens as indications of user input are received by computing device 4. For instance, additional characters may be appended to respective candidate character strings as subsequent indications of user input are received and the composite cost values associated with the respective candidate character strings may be updated. A composite cost value may include a physical cost value and a lexical cost value.

In some examples, gesture module 44 may use spatial model 26 to determine respective physical cost values for each of at least two keys of the plurality of keys included in keyboard module 12. Each of the respective physical cost values may represent a probability that a performed tap gesture indicates a key of the graphical keyboard. In some examples, the respective physical cost values may be based on characteristics, such as physical features of the tap gesture and/or physical and statistical features of the key. For instance, the respective physical cost values may be based on the physical location of the tap gesture with reference to a statistical location of the key, as stored in spatial model 26.

In some examples, lexical cost values may be based on language model 10. For instance, the respective lexical cost values may be based on the probability that a second key will be selected after a first key (e.g., the probability that the "o" key will be selected after the "c" key). In other examples, the respective lexical cost values may be based on the probability that a second candidate word will follow a first candidate word, or on the frequency values of language model 10.

In FIG. 2, as described with respect to FIG. 1, a user may intend to type "5:30". Gesture module 44 may determine a first composite cost value representing a probability that tap gesture 16A indicates the '5' key and a second composite cost value representing a probability that the tap gesture 16A indicates '&' key. Similarly, gesture module 44 may determine a third composite cost value representing a probability that tap gesture 16B indicates ':' key and a fourth composite cost value representing a probability that tap gesture 16B indicates the ';' key (which may be another of the multiple keys in proximity to the location of the tap gesture performed near ':' key). In this way, gesture module 44 may incrementally determine composite cost values, each representing a probability that a tap gesture indicates a key of the plurality of keys included in keyboard module 12.

Gesture module 44 may compare the respective composite cost values for at least two keys of the plurality of keys to determine a combination of keys having a combined composite cost value that satisfies a threshold. A combined composite cost value for a combination of keys may represent a probability that tap gestures 16A-16D, together, indicate the combination of keys. Gesture module 44 may compare the respective composite cost values for at least two keys of the plurality of keys to determine which of the at least two keys is indicated by a tap gesture. Gesture module 44 may determine a combination of keys by determining which keys are indicated by each tap gesture.

In some examples, gesture module 44 may compare the combined composite cost value of a determined combination of keys with a threshold value. In some examples, the threshold value is the combined composite cost value of a different determined combination of keys. For instance, gesture module 44 may determine a first combination of keys having a first combined composite cost value and a second combination of keys having a second combined composite cost value. In such an instance, gesture module 44 may determine one or more candidate words based on the combination of keys with the lower combined composite cost value. In FIG. 2, as described with respect to FIG. 1, gesture module 44 may compare the determined respective composite cost values to determine a combination of keys (i.e., '5', ':', '3', and '0') having a composite cost value.

In response to receiving the tap gesture data from UI module 8, gesture module 44 may determine a set of candidate character strings. Each candidate character string may be stored in a token. A token may be used to store a candidate character string and append characters as subsequent indications of gestures are received by gesture module 44. As an example, gesture module 44 may create a token at the entry node of a lexicon which may be included in language model 10. In some examples, language module 10 may be implemented as a trie data structure. Each movable token may represent a partial alignment between a node in the lexicon (i.e., a partial word and/or phrase) and a received tap gesture. A token may advance to child nodes in the lexicon (i.e., next characters in the word) as gesture module 44 receives subsequent indications of tap gestures.

As described, a lexicon trie data structure may contain a plurality of nodes, each node representing a character. Gesture module 44 may push the created token into active beam 36A. Gesture module 44 may create a token copy on each of the token's child nodes. In the example of FIG. 2, gesture module 44 may create a first token copy on the child node representing the number '5' (e.g., corresponding to a predicted key selection of '5' key) and a second token copy on the child node representing the symbol ':' (e.g., corresponding to a predicted key selection of ':' key). Each of the tokens may include a single string of predicted characters.

For each tap gesture received, gesture module 44 may determine respective composite cost values for each of at least two keys of the plurality of keys. Each of the respective composite cost values may represent a probability that the tap gesture indicates a key of the plurality of keys. Gesture module 44 may determine a first composite cost value representing a probability that the first tap gesture indicates the node representing the number '5' and a second composite cost value representing a probability that the tap gesture indicates the node representing the symbol ':'. In some examples, gesture module 44 may then update the token copy with the respective composite cost value and push the token copy in to next beam 36B. Gesture module 44 may add the first composite cost value to the first token copy and the second composite cost value to the second token copy.

In one example, gesture module 44 may determine a first physical cost value based on the Euclidian distance between the first tap gesture 16A and the '5' key, as shown in FIG. 1. In some examples, gesture module 44 may determine the physical cost values by comparing the Euclidian distance between a first tap gesture and a second tap gesture with the Euclidian distance between a first character indicated by the first tap gesture and a second character which may be represented by the second tap gesture. Gesture module 44 may determine that the cost value of the second character is inversely proportional to the difference between the distances (i.e., that the second character is more probable where the distances are more similar). That is, in some examples, physical cost values may be calculated on the geometry of the tap gestures instead of the location of the tap gestures. For instance, a smaller difference in distances may indicate a better likelihood that the second gesture was a selection of the second character.

Gesture module 44 may also determine the composite cost values for respective keys by determining lexical cost values for each of the at least two keys of the plurality of keys. Each of the respective lexical cost values may represent a probability that a character represented by a key of the plurality of keys is included in a candidate character string based on a token. The lexical cost values may be based on language model 10. For instance, the lexical cost values may represent the likelihood that a given character is selected based on probable strings included in a lexicon of language model 10 that includes categories that account for character strings that contain numbers and non-alphabetic symbols. Gesture module 44 may determine a first lexical cost value based on an entry in the lexicon indicating a frequency that the number '5' is the first character in a string.

As an example, gesture module 44 may receive an indication of tap gestures 16A and 16B. In response, gesture module 44 may determine a first token including the single string of predicted characters "5:". Gesture module 44 may determine one or more candidate character strings indicated by the gesture using the first token and applying a string pattern (e.g., a regular expression) to determine a category. For instance, gesture module 44 may determine one or more candidate character strings for which the single string of predicted characters is a prefix based on the determined category, such as the strings "5:30", "5:00", and the like, as the applied string pattern may indicate that the first token fits into a category indicating a time value.

In the present example, as a user continues to perform the tap gestures, gesture module 44 may receive an indication of tap gesture 16C. In response, gesture module 44 may create a token copy on each of the token's child nodes to include a predicted character indicated by the received portion of the gesture, such as the number '3' corresponding to a predicted selection of the '3' key. As such, gesture module 44 may advance the first token to include the single string of predicted characters "5:3". Based on the first token, gesture module 44 may determine one or more candidate character strings indicated by the gesture by applying a string pattern (e.g., a regular expression) to determine a category. Based on this category, the candidate character strings may again be times, as the applied string pattern may indicate that the determined category indicates a time value, predicting such strings as those included in the lexicon for which the single string of predicted characters "5:3" is a prefix (e.g., the strings "5:30", "5:35", and the like).

Figure 3:
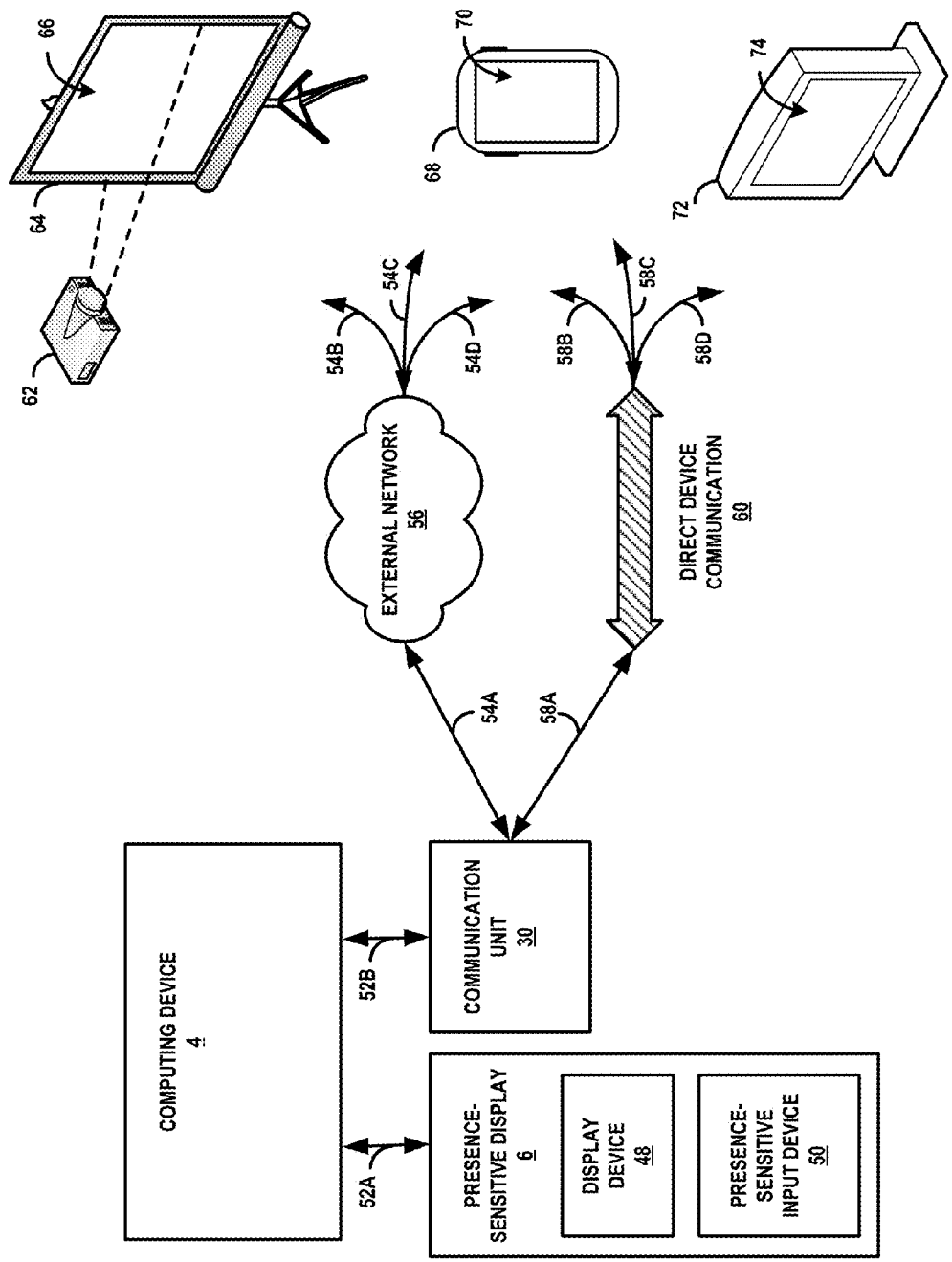
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 3 includes a computing device 4, presence-sensitive display 6, communication unit 30, projector 62, projector screen 64, mobile device 68, and visual display device 72. Although shown for purposes of example in FIGS. 1 and 2 as a stand-alone computing device, a computing device such as computing device 4 may, generally, be any component or system that includes a processor or other suitable computing environment for executing software instructions and, for example, need not include a presence-sensitive display.

As shown in the example of FIG. 3, computing device 4 may be a processor that includes functionality as described with respect to processor 28 in FIG. 2. In such examples, computing device 4 may be operatively coupled to presence-sensitive display 6 by a communication channel 52A, which may be a system bus or other suitable connection. Computing device 4 may also be operatively coupled to communication unit 30, further described below, by a communication channel 52B, which may also be a system bus or other suitable connection. Although shown separately as an example in FIG. 3, computing device 4 may be operatively coupled to presence-sensitive display 6 and communication unit 30 by any number of one or more communication channels.

In other examples, such as illustrated previously by computing device 4 in FIGS. 1-2, a computing device may refer to a portable or mobile device such as mobile phones (including smart phones), laptop computers, etc. In some examples, a computing device may be a desktop computers, tablet computers, smart television platforms, cameras, personal digital assistants (PDAs), servers, mainframes, etc.

Presence-sensitive display 6, like presence-sensitive display 4 as shown in FIG. 1, may include display device 48 and presence-sensitive input device 50. Display device 48 may, for example, receive data from computing device 4 and display the graphical content. In some examples, presence-sensitive input device 50 may determine one or more user inputs (e.g., continuous gestures, multi-touch gestures, single-touch gestures, etc.) at presence-sensitive display 6 using capacitive, inductive, and/or optical recognition techniques and send indications of such user input to computing device 4 using communication channel 52A. In some examples, presence-sensitive input device 50 may be physically positioned on top of display device 48 such that, when a user positions an input unit over a graphical element displayed by display device 48, the location at which presence-sensitive input device 50 corresponds to the location of display device 48 at which the graphical element is displayed.

As shown in FIG. 3, computing device 4 may also include and/or be operatively coupled with communication unit 30. Communication unit 30 may include functionality of communication unit 30 as described in FIG. 2. Examples of communication unit 30 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 4 may also include and/or be operatively coupled with one or more other devices, e.g., input devices, output devices, memory, storage devices, etc. that are not shown in FIG. 3 for purposes of brevity and illustration.

FIG. 3 also illustrates a projector 62 and projector screen 64. Other such examples of projection devices may include electronic whiteboards, holographic display devices, and any other suitable devices for displaying graphical content. Projector 62 and projector screen 64 may include one or more communication units that enable the respective devices to communicate with computing device 4. In some examples, the one or more communication units may enable communication between projector 62 and projector screen 64. Projector 62 may receive data from computing device 4 that includes graphical content. Projector 62, in response to receiving the data, may project the graphical content onto projector screen 64. In some examples, projector 62 may determine one or more user inputs (e.g., continuous gestures, multi-touch gestures, single-touch gestures, etc.) at projector screen using optical recognition or other suitable techniques and send indications of such user input using one or more communication units to computing device 4. In such examples, projector screen 64 may be unnecessary, and projector 62 may project graphical content on any suitable medium and detect one or more user inputs using optical recognition or other such suitable techniques.

Projector screen 64, in some examples, may include a presence-sensitive display 66. Presence-sensitive display 66 may include a subset of functionality or all of the functionality of UI device 4 as described in this disclosure. In some examples, presence-sensitive display 66 may include additional functionality. Projector screen 64 (e.g., an electronic whiteboard), may receive data from computing device 4 and display the graphical content. In some examples, presence-sensitive display 66 may determine one or more user inputs (e.g., continuous gestures, multi-touch gestures, single-touch gestures, etc.) at projector screen 64 using capacitive, inductive, and/or optical recognition techniques and send indications of such user input using one or more communication units to computing device 4.

FIG. 3 also illustrates mobile device 68 and visual display device 72. Mobile device 68 and visual display device 72 may each include computing and connectivity capabilities. Examples of mobile device 68 may include e-reader devices, convertible notebook devices, hybrid slate devices, etc. Examples of visual display device 72 may include other semi-stationary devices such as televisions, computer monitors, etc. As shown in FIG. 3, mobile device 68 may include a presence-sensitive display 70. Visual display device 72 may include a presence-sensitive display 74. Presence-sensitive displays 70, 74 may include a subset of functionality or all of the functionality of presence-sensitive display 4 as described in this disclosure. In some examples, presence-sensitive displays 70, 74 may include additional functionality. In any case, presence-sensitive display 74, for example, may receive data from computing device 4 and display the graphical content. In some examples, presence-sensitive display 74 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 4.

As described above, in some examples, computing device 4 may output graphical content for display at presence-sensitive display 6 that is coupled to computing device 4 by a system bus or other suitable communication channel. Computing device 4 may also output graphical content for display at one or more remote devices, such as projector 62, projector screen 64, mobile device 68, and visual display device 72. For instance, computing device 4 may execute one or more instructions to generate and/or modify graphical content in accordance with techniques of the present disclosure. Computing device 4 may output the data that includes the graphical content to a communication unit of computing device 4, such as communication unit 30. Communication unit 30 may send the data to one or more of the remote devices, such as projector 62, projector screen 64, mobile device 68, and/or visual display device 72. In this way, computing device 4 may output the graphical content for display at one or more of the remote devices. In some examples, one or more of the remote devices may output the graphical content at a presence-sensitive display that is included in and/or operatively coupled to the respective remote devices.

In some examples, computing device 4 may not output graphical content at presence-sensitive display 6 that is operatively coupled to computing device 4. In other examples, computing device 4 may output graphical content for display at both a presence-sensitive display 6 that is coupled to computing device 4 by communication channel 52A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 4 and output for display at presence-sensitive display 6 may be different than graphical content display output for display at one or more remote devices.

Computing device 4 may send and receive data using any suitable communication techniques. For example, computing device 4 may be operatively coupled to external network 56 using network link 54A. Each of the remote devices illustrated in FIG. 3 may be operatively coupled to network external network 56 by one of respective network links 54B, 54C, and 54D. External network 56 may include network hubs, network switches, network routers, etc., that are operatively inter-coupled thereby providing for the exchange of information between computing device 4 and the remote devices illustrated in FIG. 3. In some examples, network links 54A-54D may be Ethernet, ATM or other network connections. Such connections may be wireless and/or wired connections.

In some examples, computing device 4 may be operatively coupled to one or more of the remote devices included in FIG. 3 using direct device communication 60. Direct device communication 60 may include communications through which computing device 4 sends and receives data directly with a remote device, using wired or wireless communication. That is, in some examples of direct device communication 60, data sent by computing device 4 may not be forwarded by one or more additional devices before being received at the remote device, and vice-versa. Examples of direct device communication 60 may include Bluetooth, Near-Field Communication, Universal Serial Bus, WiFi, infrared, etc. One or more of the remote devices illustrated in FIG. 3 may be operatively coupled with computing device 4 by communication links 58A-58D. In some examples, communication links 58A-58D may be connections using Bluetooth, Near-Field Communication, Universal Serial Bus, infrared, etc. Such connections may be wireless and/or wired connections.

In accordance with techniques of the disclosure, computing device 4 may be operatively coupled to visual display device 72 using external network 56. Computing device 4 may output a graphical keyboard for display at presence-sensitive display 74. For instance, computing device 4 may send data that includes a representation of the graphical keyboard to communication unit 30. Communication unit 30 may send the data that includes the representation of the graphical keyboard to visual display device 72 using external network 56. Visual display device 72, in response to receiving the data using external network 56, may cause presence-sensitive display 74 to output the graphical keyboard. In response to a user performing a gesture at presence-sensitive display 74 (e.g., at a region of presence-sensitive display 74 that outputs the graphical keyboard), visual display device 72 may send an indication of the gesture to computing device 4 using external network 56. Communication unit 30 of may receive the indication of the gesture, and send the indication to computing device 4.

In response to receiving an indication of at least one gesture detected at a presence-sensitive input device, computing device 4 may model an input string comprising a group of one or more characters that include numbers or non-alphabetic symbols. Computing device 4 may determine a candidate character string to either complete the input string or to follow the input string as a suggested next word. Computing device 4 does this by classifying the group of one or more characters into a category using a string pattern. In response to determining candidate character string with the highest probability based on the language model and the determined category, computing device 4 may output for display, the candidate character string. For instance, computing device 4 may send data representing the candidate character string to communication unit 30. Communication unit 30 may send the candidate character string to visual display device 72 via external network 56. Visual display device 72 may cause presence-sensitive display 74 to output the candidate character string.

Figure 4B:
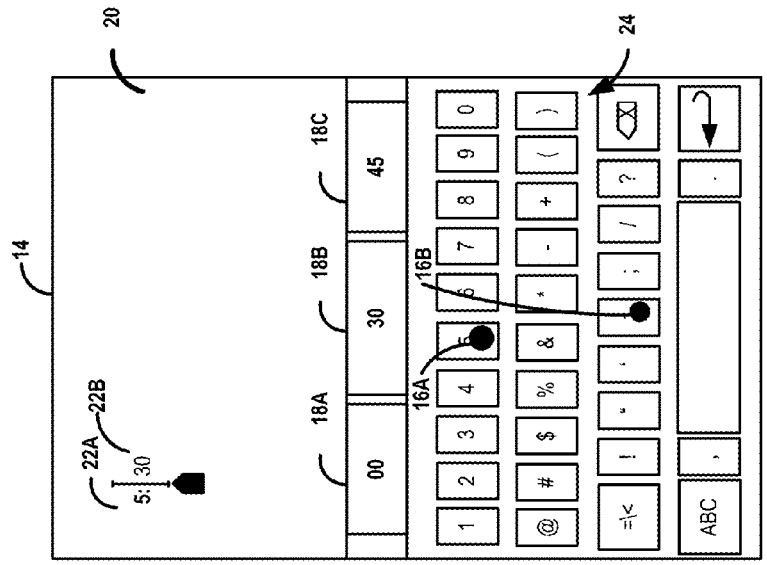
FIGS. 4A through 4C are a set of block diagrams illustrating a sequence of input and updates to a GUI, in accordance with one or more aspects of the present disclosure.
Figure 4A:
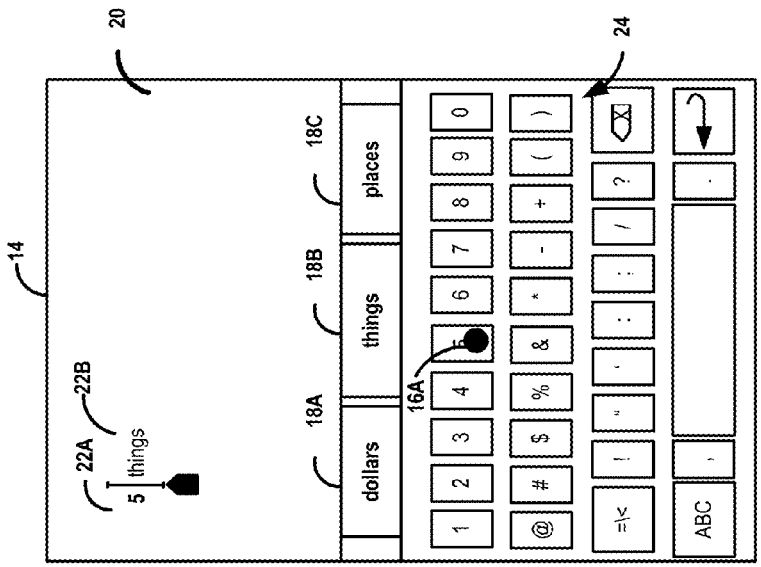
Figure 4C:
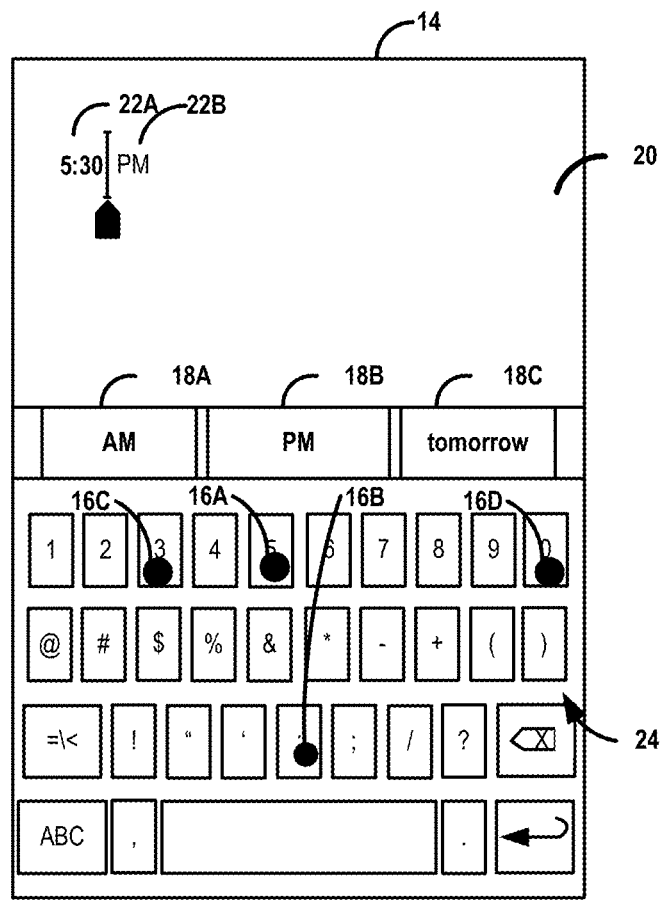

FIGS. 4A through 4C are a set of block diagrams illustrating a sequence of input and updates to a GUI, in accordance with one or more aspects of the present disclosure. As shown in FIG. 4A, user interface 14 includes a graphical keyboard 24, which is output by a computing device, such as computing device 4, as shown in FIGS. 1 and 2. User interface 14 also includes edit region 20, which displays input strings as indicated by gestured input and a candidate character string based on the gestured input. Input is received by the computing device through input gesture 16A. In the example of FIG. 4A, the input gesture 16A indicates that the character '5' will be input. As such, the character '5' is displayed on the screen as input string 22A.

Using a language model, such as language model 10 as shown in FIGS. 1 and 2, the computing device classifies input string 22A into a category based on a string pattern. This string pattern could either be a literal character match or a regular expression match. In the example of FIG. 4A, the input string is classified into a "generic numbers" category. As such, using the language model, the three candidate character strings 18A-18C that are displayed in user interface 14 are the three candidate character strings with the highest probabilities based on the language model and the category. Since input string 22A satisfies the definition of a generic number, the candidate character strings are going to be suggested next words. In the example of FIG. 4A, the top three candidate character strings 18A-18C for this case are the suggested next words of "things," "dollars," and "places," although these words could be changed by differences in the language model used. Candidate character string 18B is the candidate character string with the highest probability of being chosen, in this example, and may be displayed in suggested candidate character string 22B in edit region 20 accordingly.

In FIG. 4B, the next character in the input sequence is received by input gesture 16B. In the example of FIG. 4B, the input gesture 16B indicates that the character ':' will be input. As such, the character ':' is displayed on the screen, in addition to the character '5' as received by input gesture 16A, as input string 22A.

Using a language model, such as language model 10 as shown in FIGS. 1 and 2, the computing device classifies input string 22A into a category based on a string pattern. This string pattern could either be a literal character match or a regular expression match. In the example of FIG. 4B, the input string is no longer classified into the "generic numbers"

category due to the addition of the ':' character, as received by input gesture 16B. The category has now updated to a "time" category in the language model, as a number between 0 and 23 followed by a colon is typically seen as a time input. As such, using the language model, the three candidate character strings 18A-18C that are displayed in user interface 14 are the three candidate character strings with the highest probabilities based on the language model and the category of "time". Since input string 22A is not a completed time, the candidate character strings are strings that could be used to complete the time input. In the example of FIG. 4B, the top three candidate character strings 18A-18C for this case are the string completions of "30," "00," and "45," although these strings could be changed by differences in the language model used. Candidate character string 18B is the candidate character string with the highest probability of being chosen, in this example, and may be displayed in suggested candidate character string 22B in edit region 20 accordingly.

In FIG. 4C, the next characters in the input sequence are received by input gestures 16C and 16D. In the example of FIG. 4C, the input gesture 16C indicates that the character '3' will be input, followed by input gesture 16D which indicates that the character '0' will be input. As such, the characters '3' and '0' are displayed on the screen, in addition to the characters "5:" as received by input gestures 16A and 16B, as input string 22A.

Using a language model, such as language model 10 as shown in FIGS. 1 and 2, the computing device classifies input string 22A into a category based on a string pattern. This string pattern could either be a literal character match or a regular expression match. In the example of FIG. 4C, the input string is still classified as a "time". As such, using the language model, the three candidate character strings 18A-18C that are displayed in user interface 14 are the three candidate character strings with the highest probabilities based on the language model and the category of "time". The difference in FIG. 4C is that the time is now a completed time. Since input string 22A is now a completed time, the candidate character strings are suggested next words, or strings that could be used to supplement the time input as a candidate character string that is likely to follow a completed time input. In the example of FIG. 4C, the top three candidate character strings 18A-18C for this case are the suggested next words of "PM," "AM," and "tomorrow," although these strings could be changed by differences in the language model used. Candidate character string 18B is the candidate character string with the highest probability of being chosen, in this example, and may be displayed in suggested candidate character string 22B in edit region 20 accordingly.

Figure 5A:
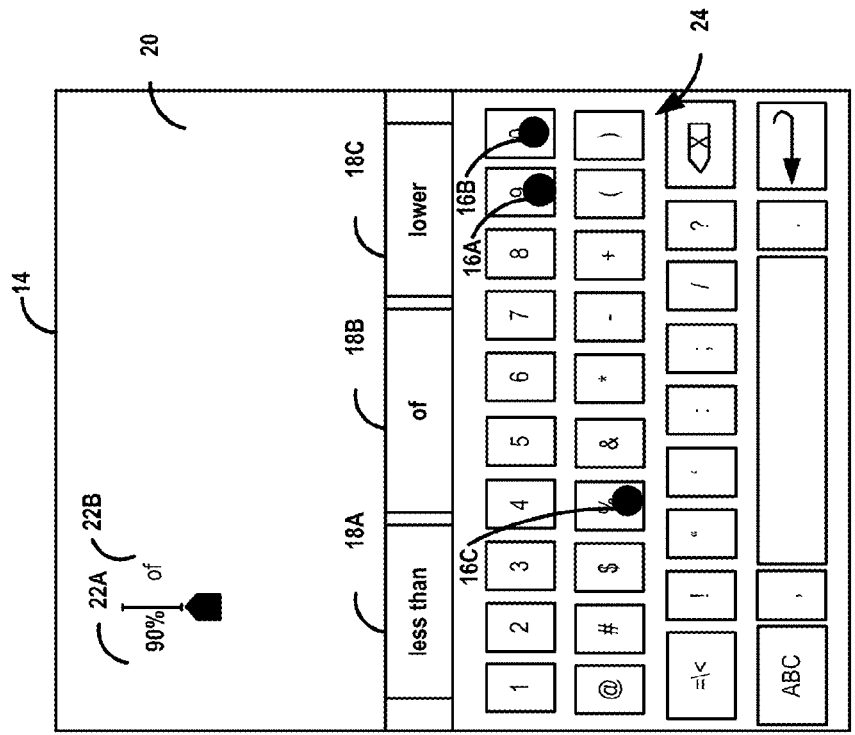
FIGS. 5A and 5B are block diagrams illustrating further examples of GUIs that display a string containing numbers or non-alphabetic symbols, in accordance with one or more aspects of the present disclosure.
Figure 5B:
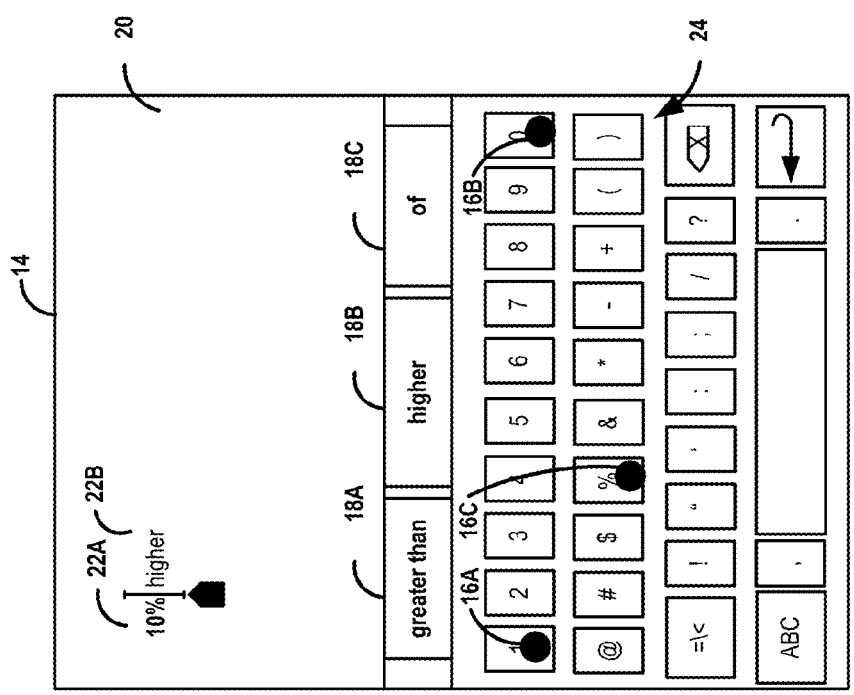

FIGS. 5A and 5B are block diagrams illustrating further examples of GUIs that display a string containing numbers or non-alphabetic symbols, in accordance with one or more aspects of the present disclosure. More specifically, FIGS. 5A and 5B show how different sub-categories within the same overall category may show different candidate character strings. As shown in FIGS. 5A and 5B, user interface 14 shows a graphical keyboard 24, which is output by a computing device, such as computing device 4, as shown in FIGS. 1 and 2. User interface 14 also shows edit region 20, which displays input strings as indicated by gestured input and a candidate character string based on the gestured input.

In FIG. 5A, input gestures 16A, 16B, and 16C, in that order, are received at graphical keyboard 24. The characters associated with these keys are determined to be '1', '0', and '%'. Due to the inclusion of the '%' character, the string pattern will indicate that the input string is classified as a "percentage". As such, using the language model, such as language model 10 in FIGS. 1 and 2, the three candidate character strings 18A-18C that are displayed in user interface 14 are the three candidate character strings that are the best suggested next word candidates, or strings that could be used to supplement the percentage input as a candidate character string that is likely to follow a percentage. In some examples, this category could further be broken down into subcategories, using either regular expressions or literal character matching. For instance, the "percentage" category could be broken into subcategories that share similar contexts with the parent category, such as: a percentage less than 50%, 50% exactly, a percentage greater than 50% but less than 100%, 100% exactly, or a percentage greater than 100%. Using these subcategories, the input string 22A of "10%" would fall in the "a percentage less than 50%" subcategory. In the example of FIG. 5A, the top three candidate character strings 18A-18C for this subcategory are the suggested next words of "higher," "greater than," and "of," although these strings could be changed by differences in the language model used. Candidate character string 18B is the candidate character string with the highest probability of being chosen, in this example, and may be displayed in suggested candidate character string 22B in edit region 20 accordingly.

In FIG. 5B, input gestures 16A, 16B, and 16C, in that order, are received at graphical keyboard 24. The characters associated with these keys are determined to be '9', '0', and '%'. Similar to the example in FIG. 5A, the inclusion of the '%' character means that the string pattern will indicate that the input string is classified as a "percentage". As such, using the language model, such as language model 10 in FIGS. 1 and 2, the three candidate character strings 18A-18C that are displayed in user interface 14 are the three candidate character strings that are the best suggested next word candidates, or strings that could be used to supplement the percentage input as a candidate character string that is likely to follow a percentage. Input string 22A would have a different subcategory than the input string of FIG. 5A, as determined by regular expressions. Input string 22A of "90%" would instead fall in the "a percentage greater than 50% but less than 100%" subcategory. In the example of FIG. 5B, the top three candidate character strings 18A-18C for this subcategory are the suggested next words of "of," "less than," and "lower," although these strings could be changed by differences in the language model used. Candidate character string 18B is the candidate character string with the highest probability of being chosen, in this example, and is displayed in suggested candidate character string 22B in edit region 20 accordingly.

Figure 6:
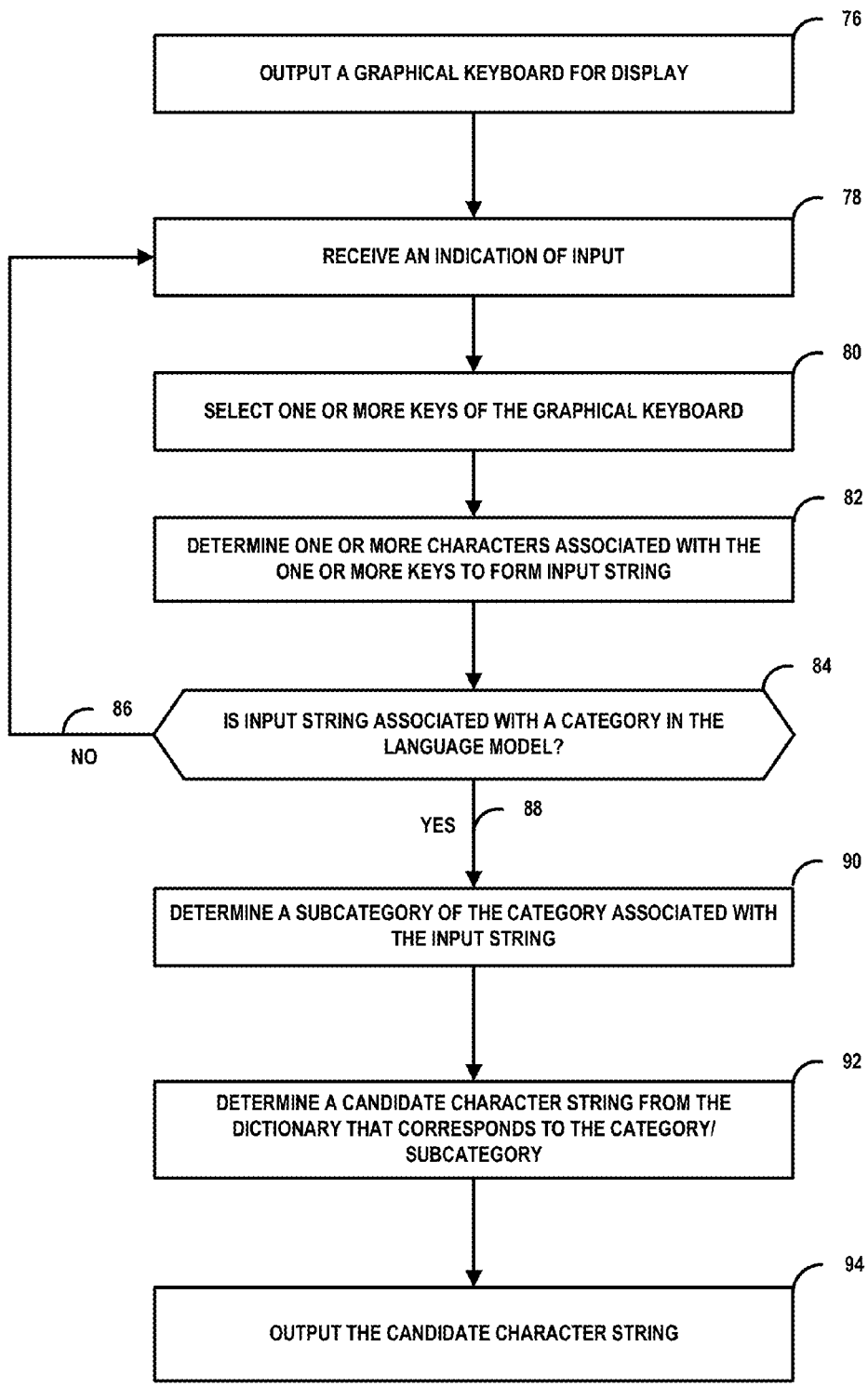
FIG. 6 is a flow diagram illustrating example operations of a computing device configured to determine a string containing numbers or non-alphabetic symbols, in accordance with one or more aspects of the present disclosure.

FIG. 6 is a flow diagram illustrating example operations of a computing device configured to determine a string containing numbers or non-alphabetic symbols, in accordance with one or more aspects of the present disclosure. In this example, a computing device (e.g., computing device 4) outputs a graphical keyboard (e.g., graphical keyboard 24) (76). The computing device receives an indication of input (e.g., input gesture 16A) (78). Based at least in part on the indication of input, the computing device selects one or more keys of the graphical keyboard (80). The computing device determines one or more characters associated with the one or more keys to form an input string (e.g., inputs string 22A) (82).

The computing device determines if the input string is associated with a category in a language model (e.g., language model 10) (84). In some examples, to determine if the input string is associated with the category, the computing device may compare the group of one or more characters associated with the one or more keys to at least one string pattern, wherein the at least one string pattern is associated with the category. The computing device may identify the category based on determining that one or more characters match the at least one string pattern. In some examples, the string pattern could be at least one of a regular expression and a string of literal characters. In some examples, the category could indicate at least one of a time, a date, an arbitrary number, an address, an e-mail address, a percentage, a uniform resource locator, or a number symbol, among other things.

If the input string is not associated with a category (86), the computing device determines additional input. If the input string is associated with a category (88), the computing device determines if a subcategory of the category associated with the input string is applicable to the current input string (90). In some examples, to determine if a subcategory is associated with the input string, the computing device may compare the group of one or more characters associated with the one or more keys to a second set of one or more string pattern, wherein each string patterns of the second set is associated with a respective subcategory, wherein the subcategory is a subset of the category. The computing device may determine the subcategory based on a string pattern in the second set that matches at least a portion of the group of one or more characters associated with the one or more keys.

The computing device may determine a candidate character string (e.g., candidate character string 18B) using the language model based on the determined category or subcategory (92). In some examples, to determine the candidate character string, the computing device may determine a respective frequency score for each of one or more candidate character strings associated with the category, and determine a subset of the one or more candidate character strings, wherein each candidate character string of the subset of one or more character strings is associated with a respective frequency score that is greater than frequency scores respectively associated with candidate character strings not included in the group of one or more candidate character strings, wherein the subset of one or more candidate character strings includes the at least one candidate character string. In some examples, act 92 comprises determining a group of string-frequency pairs from a plurality of string-frequency pairs within the language model based on the determined category. In some examples, the candidate character string is a suggested next word to follow the indication of input. In these cases, the computing device may receive an indication of input and output, for display, the suggested next word following the previously inputted string within an edit region of the graphical user interface.

The computing device outputs the candidate character string for display (94). In some examples, multiple candidate character strings are determined and output for display. In some examples, the computing device could further receive an indication of input, indicating a selection of one of the at least one candidate character strings and output the one of the at least one candidate character strings in an edit region.

Example 1

A method comprising: outputting, by a computing device and for display, a graphical keyboard; receiving, by the computing device, an indication of input; selecting, by the computing device and based at least in part on the indication of the input, one or more keys of the graphical keyboard; classifying, by the computing device, a group of one or more characters associated with the one or more keys into a category, wherein at least one of the group of one or more characters comprises at least one of a number or a non-alphabetic symbol; determining, by the computing device and based at least in part on a language model, at least one candidate character string that corresponds to the category; and outputting, by the computing device and for display, the at least one candidate character string.

Example 2

The method of example 1, wherein classifying the group of one or more characters associated with the one or more keys into the category comprises: comparing, by the computing device, the group of one or more characters associated with the one or more keys to at least one string pattern, wherein the at least one string pattern is associated with the category; and identifying, by the computing device, the category based on determining that the one or more characters match the at least one string pattern.

Example 3

The method of any of examples 1-2, further comprising: comparing, by the computing device, the group of one or more characters associated with the one or more keys to a second set of one or more one string patterns, wherein each string pattern of the second set is associated with a respective subcategory, wherein the respective subcategory is a subset of the category; and determining, by the computing device, a subcategory based on a string pattern in the second set that matches at least a portion of the group of one or more characters associated with the one or more keys.

Example 4

The method of any of examples 1-3, wherein the at least one string pattern is at least one of a regular expression and a string of literal characters.

Example 5

The method of any of examples 1-4, wherein the category indicates at least one of a time, a date, an arbitrary number, an address, an e-mail address, a percentage, a uniform resource locator, and a number symbol.

Example 6

The method of any of examples 1-5, wherein determining the at least one candidate character string that corresponds to the category comprises: determining, by the computing device, a respective frequency score for each of one or more candidate character strings associated with the category; and determining, by the computing device, a subset of the one or more candidate character strings, wherein each candidate character string of the subset of one or more character strings is associated with a respective frequency score that is greater than frequency scores respectively associated with candidate character strings not included in the group of one or more candidate character strings, wherein the subset of one or more candidate character strings includes the at least one candidate character string.

Example 7

The method of any of examples 1-6, further comprising: receiving, by the computing device, an indication of input to select one of the subset of one or more candidate character strings; and outputting, by the computing device and for display, the selected one of the one or more candidate character strings in an edit region of a graphical user interface.

Example 8

The method of any of examples 1-7, further comprising determining, by the computing device, a group of string-frequency pairs from a plurality of string-frequency pairs within the language model based on the category.

Example 9

The method of any of examples 1-8, wherein the at least one candidate character string is a suggested next word, the method further comprising: responsive to receiving an indication of input, outputting, by the computing device and for display, the suggested next word following a previously inputted string within an edit region of a graphical user interface.

Example 10

A computing device configured to: output, for display, a graphical keyboard; receive an indication of input; select, based at least in part on the indication of the input, one or more keys of the graphical keyboard; classify a group of one or more characters associated with the one or more keys into a category, wherein at least one of the group of one or more characters comprises at least one of a number or a non-alphabetic symbol; determine, based at least in part on a language model, at least one candidate character string that corresponds to the category; and output, for display, the at least one candidate character string.

Example 11

The computing device of example 10, wherein the computing device is configured to: compare the group of one or more characters associated with the one or more keys to at least one string pattern, wherein the at least one string pattern is associated with the category; and identify the category based on determining that the one or more characters match the at least one string pattern.

Example 12

The computing device of any of examples 10-11, wherein the computing device is further configured to: compare the group of one or more characters associated with the one or more keys to a second set of one or more one string patterns, wherein each string pattern of the second set is associated with a respective subcategory, wherein the respective subcategory is a subset of the category; and determine a subcategory based on a string pattern in the second set that matches at least a portion of the group of one or more characters associated with the one or more keys.

Example 13

The computing device of any of examples 10-12, wherein the at least one string pattern is at least one of a regular expression and a string of literal characters.

Example 14

The computing device of any of examples 10-13, wherein the category indicates at least one of a time, a date, an arbitrary number, an address, an e-mail address, a percentage, a uniform resource locator, and a number symbol.

Example 15

The computing device of any of examples 10-14, wherein the computing device is configured to: determine a respective frequency score for each of one or more candidate character strings associated with the category; and determine a subset of the one or more candidate character strings, wherein each candidate character string of the subset of one or more character strings is associated with a respective frequency score that is greater than frequency scores respectively associated with candidate character strings not included in the group of one or more candidate character strings, wherein the subset of one or more candidate character strings includes the at least one candidate character string.

Example 16

The computing device of any of examples 10-15, wherein the computing device is further configured to determine a group of string-frequency pairs from a plurality of string-frequency pairs within the language model based on the category.

Example 17

A computer-readable storage medium encoded with instructions that, when executed, cause at least one processor to: output, for display, a graphical keyboard; receive an indication of input; select, based at least in part on the indication of the input, one or more keys of the graphical keyboard; classify a group of one or more characters associated with the one or more keys into a category, wherein at least one of the group of one or more characters comprises at least one of a number or a non-alphabetic symbol; determine, based at least in part on a language model, at least one candidate character string that corresponds to the category; and output, for display, the at least one candidate character string.

Example 18

The computer-readable storage medium of example 17, wherein the computer-readable storage medium is encoded with instructions that, when executed, cause the at least one processor to: compare the group of one or more characters associated with the one or more keys to at least one string pattern, wherein the at least one string pattern is associated with the category; and identify the category based on determining that the one or more characters match the at least one string pattern.

Example 19

The computer-readable storage medium of any of examples 17-18, wherein the instructions, when executed, further cause the at least one processor to: compare the group of one or more characters associated with the one or more keys to a second set of one or more one string patterns, wherein each string pattern of the second set is associated with a respective subcategory, wherein the respective subcategory is a subset of the category; and determine a subcategory based on a string pattern in the second set that matches at least a portion of the group of one or more characters associated with the one or more keys.

Example 20

The computer-readable storage medium of any of examples 17-19, wherein the at least one string pattern is at least one of a regular expression and a string of literal characters.

Example 21

The computer-readable storage medium of any of examples 17-20, wherein the category indicates at least one of a time, a date, an arbitrary number, an address, an e-mail address, a percentage, a uniform resource locator, and a number symbol.

Example 22

The computer-readable storage medium of any of examples 17-21, wherein the computer-readable storage medium is encoded with instructions that, when executed, cause the at least one processor to: determine a respective frequency score for each of one or more candidate character strings associated with the category; and determine a subset of the one or more candidate character strings, wherein each candidate character string of the subset of one or more character strings is associated with a respective frequency score that is greater than frequency scores respectively associated with candidate character strings not included in the group of one or more candidate character strings, wherein the subset of one or more candidate character strings includes the at least one candidate character string.

Example 23

The computer-readable storage medium of any of examples 17-22, wherein the computing device is further configured to determine a group of string-frequency pairs from a plurality of string-frequency pairs within the language model based on the category.

Techniques of this disclosure may enable a computing device to extend next-word prediction to character strings containing numbers or non-alphabetic symbols, while improving and/or maintaining the speed and ease that single continuous gesture inputs and gesture-based graphical keyboards provide to the user. As such, the techniques described in this disclosure may improve the speed with which a user can type character strings that contain numbers or non-alphabetic symbols. The technique may reduce or prevent the computing device from erroneously auto-correcting or erroneously predicting a candidate character string containing numbers or non-alphabetic symbols from a gesture input. In this way, the techniques may reduce and/or eliminate the need for the user to enter words that commonly follow or complete different categories of character strings that contain numbers or non-alphabetic symbols. Consequently, the computing device may receive fewer inputs from a user to manually enter those strings, thereby reducing user effort to input character strings. A computing device that receives fewer inputs may, in some examples, perform fewer operations and as such consume less electrical power.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Various embodiments of the disclosure have been described. These and other embodiments are within the scope of the following claims.

The invention claimed is:

1. A method comprising:
   outputting, by a computing device and for display, a graphical keyboard;
   receiving, by the computing device, an indication of input;
   selecting, by the computing device and based at least in part on the indication of the input, a plurality of respective keys of the graphical keyboard;
   responsive to selecting the plurality of respective keys, classifying, by the computing device, a plurality of respective characters associated with the plurality of respective keys into a category based at least in part on one or more of the plurality of respective characters matching at least one metacharacter that corresponds to a format for the category, wherein at least one character of the plurality of respective characters comprises at least one of a number or a non-alphabetic symbol;
   determining, by the computing device and based at least in part on a language model, at least one candidate character string that corresponds to the category, such that the at least one candidate character string is based at least in part on the format for the category, wherein the language model comprises data indicating a probability of at least one character string based on the indication of input; and
   outputting, by the computing device, for display, and based on determining the at least one candidate string that corresponds to the category, the at least one candidate character string.

2. The method of claim 1, wherein classifying the plurality of respective characters associated with the plurality of respective keys into the category comprises:
   comparing, by the computing device, the plurality of respective characters associated with the plurality of respective keys to at least one string pattern that includes the at least one metacharacter, wherein the at least one string pattern is associated with the category; and
   identifying, by the computing device, the category based on determining that the plurality of respective characters matches the at least one string pattern.

3. The method of claim 2, further comprising:
   comparing, by the computing device, the plurality of respective characters associated with the plurality of respective keys to a second set of one or more one string patterns that include the at least one metacharacter, wherein each string pattern of the second set is associated with a respective subcategory, wherein the respective subcategory is a subset of the category; and
   determining, by the computing device, a subcategory based on a string pattern in the second set that matches at least a portion of the plurality of respective characters associated with the plurality of respective keys.

4. The method of claim 2, wherein the at least one string pattern is a regular expression.

5. The method of claim 2, wherein the category indicates at least one of a time, a date, an arbitrary number, an address, an e-mail address, a percentage, a uniform resource locator, and a number symbol.

6. The method of claim 1, wherein determining the at least one candidate character string that corresponds to the category comprises:
   determining, by the computing device, a respective frequency score for each of one or more candidate character strings associated with the category; and
   determining, by the computing device, a subset of the one or more candidate character strings, wherein each candidate character string of the subset of one or more character strings is associated with a respective frequency score that is greater than frequency scores respectively associated with candidate character strings not included in the group of one or more candidate character strings, wherein the subset of one or more candidate character strings includes the at least one candidate character string.

7. The method of claim 6, further comprising:
   receiving, by the computing device, an indication of input to select one of the subset of one or more candidate character strings; and
   outputting, by the computing device and for display, the selected one of the one or more candidate character strings in an edit region of a graphical user interface.

8. The method of claim 1, further comprising determining, by the computing device, a group of string-frequency pairs from a plurality of string-frequency pairs within the language model based on the category.

9. The method of claim 1, wherein the at least one candidate character string is a suggested next word, the method further comprising:
   responsive to receiving an indication of input, outputting, by the computing device and for display, the suggested next word following a previously inputted string within an edit region of a graphical user interface.

10. A computing device configured to:
    output, for display, a graphical keyboard;
    receive an indication of input;
    select, based at least in part on the indication of the input, a plurality of respective keys of the graphical keyboard;
    responsive to selecting the plurality of respective keys, classify a plurality of respective characters associated with the plurality of respective keys into a category based at least in part on one or more of the plurality of respective characters matching at least one metacharacter that corresponds to a format for the category, wherein at least one character of the plurality of respective characters comprises at least one of a number or a non-alphabetic symbol;
    determine, based at least in part on a language model, at least one candidate character string that corresponds to the category, such that the at least one candidate character string is based at least in part on the format for the category, wherein the language model comprises data indicating a probability of at least one character string based on the indication of input; and
    output, for display, based on determining the at least one candidate string that corresponds to the category, the at least one candidate character string.

11. The computing device of claim 10, wherein the computing device is configured to:
    compare the plurality of respective characters associated with the plurality of respective keys to at least one string pattern that includes the at least one metacharacter, wherein the at least one string pattern is associated with the category; and
    identify the category based on determining that the plurality of respective characters matches the at least one string pattern.

12. The computing device of claim 11, wherein the computing device is further configured to:

compare the plurality of respective characters associated with the plurality of respective keys to a second set of one or more one string patterns that include the at least one metacharacter, wherein each string pattern of the second set is associated with a respective subcategory, wherein the respective subcategory is a subset of the category; and determine a subcategory based on a string pattern in the second set that matches at least a portion of the group of the plurality of respective characters associated with the plurality of respective keys.

13. The computing device of claim 11, wherein the at least one string pattern is a regular expression.

14. The computing device of claim 11, wherein the category indicates at least one of a time, a date, an arbitrary number, an address, an e-mail address, a percentage, a uniform resource locator, and a number symbol.

15. The computing device of claim 10, wherein the computing device is configured to:
determine a respective frequency score for each of one or more candidate character strings associated with the category; and
determine a subset of the one or more candidate character strings, wherein each candidate character string of the subset of one or more character strings is associated with a respective frequency score that is greater than frequency scores respectively associated with candidate character strings not included in the group of one or more candidate character strings, wherein the subset of one or more candidate character strings includes the at least one candidate character string.

16. The computing device of claim 10, wherein the computing device is further configured to determine a group of string-frequency pairs from a plurality of string-frequency pairs within the language model based on the category.

17. A computer-readable storage medium encoded with instructions that, when executed, cause at least one processor to:
output, for display, a graphical keyboard;
receive an indication of input;
select, based at least in part on the indication of the input, a plurality of respective keys of the graphical keyboard;
responsive to selecting the plurality of respective keys, classify a plurality of respective characters associated with the plurality of respective keys into a category based at least in part on one or more of the plurality of respective characters matching at least one metacharacter that corresponds to a format for the category, wherein at least one character of the plurality of respective characters comprises at least one of a number or a non-alphabetic symbol;
determine, based at least in part on a language model, at least one candidate character string that corresponds to the category, such that the at least one candidate character string is based at least in part on the format for the category, wherein the language model comprises data indicating a probability of at least one character string based on the indication of input; and
output, for display, based on determining the at least one candidate string that corresponds to the category, the at least one candidate character string.

18. The computer-readable storage medium of claim 17, wherein the computer-readable storage medium is encoded with instructions that, when executed, cause the at least one processor to:
compare the plurality of respective characters associated with the plurality of respective keys to at least one string pattern that include the at least one metacharacter, wherein the at least one string pattern is associated with the category; and
identify the category based on determining that the plurality of respective characters match the at least one string pattern.

19. The computer-readable storage medium of claim 18, wherein the instructions, when executed, further cause the at least one processor to:
compare the plurality of respective characters associated with the plurality of respective keys to a second set of one or more one string patterns that include the at least one metacharacter, wherein each string pattern of the second set is associated with a respective subcategory, wherein the respective subcategory is a subset of the category; and
determine a subcategory based on a string pattern in the second set that matches at least a portion of the group of the plurality of respective characters associated with the plurality of respective keys.

20. The computer-readable storage medium of claim 18, wherein the at least one string pattern is a regular expression.

21. The computer-readable storage medium of claim 18, wherein the category indicates at least one of a time, a date, an arbitrary number, an address, an e-mail address, a percentage, a uniform resource locator, and a number symbol.

22. The computer-readable storage medium of claim 17, wherein the computer-readable storage medium is encoded with instructions that, when executed, cause the at least one processor to:
determine a respective frequency score for each of one or more candidate character strings associated with the category; and
determine a subset of the one or more candidate character strings, wherein each candidate character string of the subset of one or more character strings is associated with a respective frequency score that is greater than frequency scores respectively associated with candidate character strings not included in the group of one or more candidate character strings, wherein the subset of one or more candidate character strings includes the at least one candidate character string.

23. The computer-readable storage medium of claim 17, wherein the computing device is further configured to determine a group of string-frequency pairs from a plurality of string-frequency pairs within the language model based on the category.

* * * * *